US006915465B2

(12) United States Patent
Fujiwara et al.

(10) Patent No.: US 6,915,465 B2
(45) Date of Patent: Jul. 5, 2005

(54) RECEIVED-SIGNAL COMBINING METHOD AND SYSTEM

(75) Inventors: Atsushi Fujiwara, Yokohama (JP); Shinzo Ohkubo, Yokosuka (JP); Hirohito Suda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 841 days.

(21) Appl. No.: 09/789,541

(22) Filed: Feb. 22, 2001

(65) Prior Publication Data

US 2001/0020285 A1 Sep. 6, 2001

(30) Foreign Application Priority Data

Feb. 23, 2000 (JP) ........................................ 2000-046625

(51) Int. Cl.[7] .......................... G01R 31/28; H04B 1/10; H04B 17/02
(52) U.S. Cl. ........................ 714/712; 375/349; 455/137
(58) Field of Search ................................ 714/712, 797, 714/794, 821; 370/213, 227; 375/340, 260, 267, 349, 354; 455/132–135, 137

(56) References Cited

U.S. PATENT DOCUMENTS

| | | | |
|---|---|---|---|
| 5,493,584 A | | 2/1996 | Emeott |
| 5,742,646 A | | 4/1998 | Woolley et al. |
| 6,088,407 A | * | 7/2000 | Buternowsky et al. ...... 375/347 |
| 6,272,119 B1 | * | 8/2001 | Kage .......................... 370/335 |

FOREIGN PATENT DOCUMENTS

| | | |
|---|---|---|
| EP | 0 620 657 | 10/1994 |
| JP | 10-247873 | 9/1998 |
| JP | 11-27200 | 1/1999 |

OTHER PUBLICATIONS

"Application of Methods of Combined Signal Processing in Systems of Mobile Communication" by Grigoryev et al. Internation Conference on Satellite Communications, 1998. Date: Sep. 22–24, 1998 page(s): 134–138 vol. 1 Inspec Accession No.: 6258954.*

"Full Spectrum Combining of Staggered–QPSK Signals" by Shihabi et al. IEEE International Conference on Communications, Date: Jun. 18–22, 1995 page(s): 879–833 vol. 2 Inspec Accession No.: 5211725.*

"Algorithms for Coherent Diversity Combining of M–ary Orthogonal Signals" Thompson et al. 48th IEEE Vehicular Technology Conference, 1998. Date: May 18–21, 1998 page(s): 534–538 vol. 1 Inspec Accession No.: 6090618.*

* cited by examiner

*Primary Examiner*—Guy J. Lamarre
*Assistant Examiner*—Cynthia Britt
(74) *Attorney, Agent, or Firm*—Oblon, Spivak, McClelland, Maier & Neustadt, P.C.

(57) ABSTRACT

A received-signal combining method of transmitting a signal, based on a signal having undergone error-correction coding and transmitted from a radio-transmitting station, to a receiving station from a plurality of radio-receiving stations, and generating a reception-information sequence based on the thus-transmitted signal by the receiving station, comprises the steps of: each radio-receiving station rendering error-correction decoding and error detection processing on the signal transmitted from the radio-transmitting station, and transmitting the error-correction-decoding result to the receiving station when no error is detected by the error detection processing; and the receiving station combining the received error-correction-decoding result according to a first algorithm when receiving the error-correction-decoding result from any radio-receiving station, and, thus, generating the reception-information sequence.

42 Claims, 23 Drawing Sheets

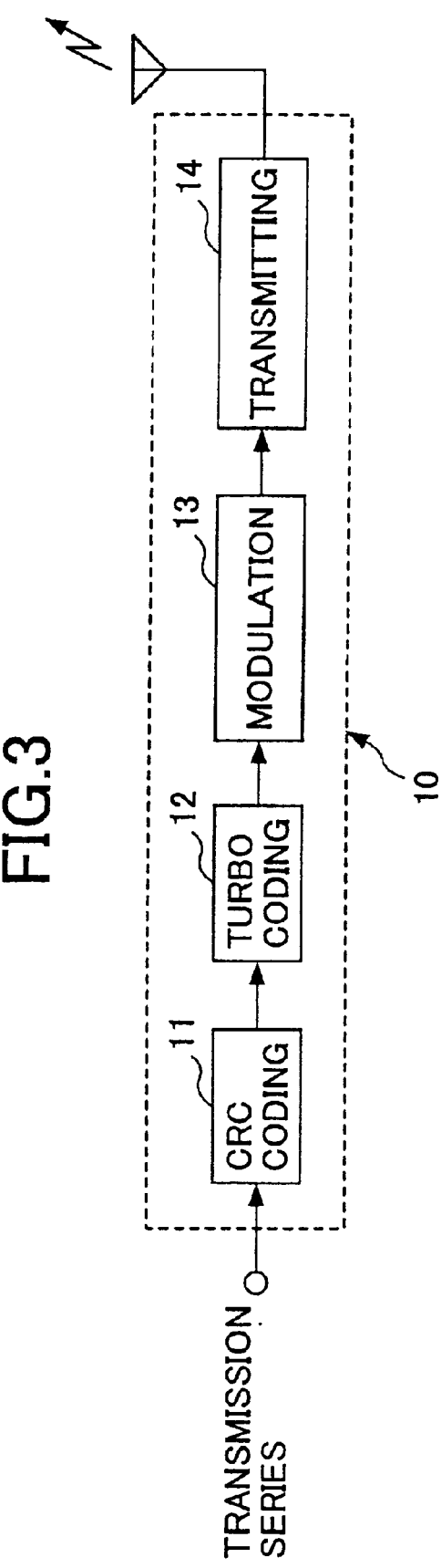

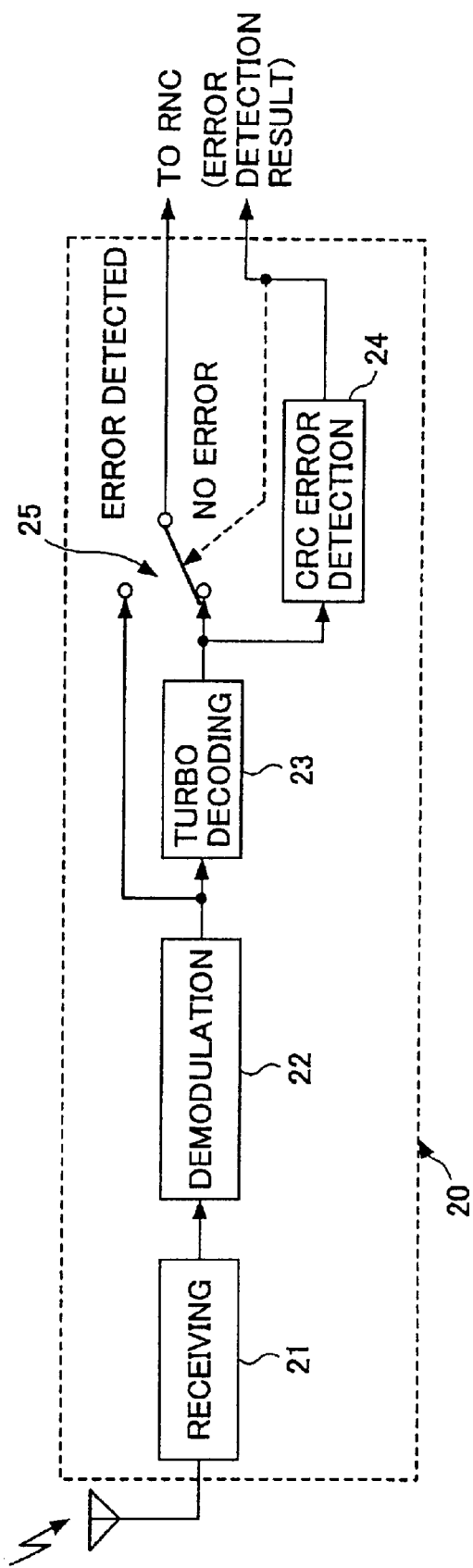

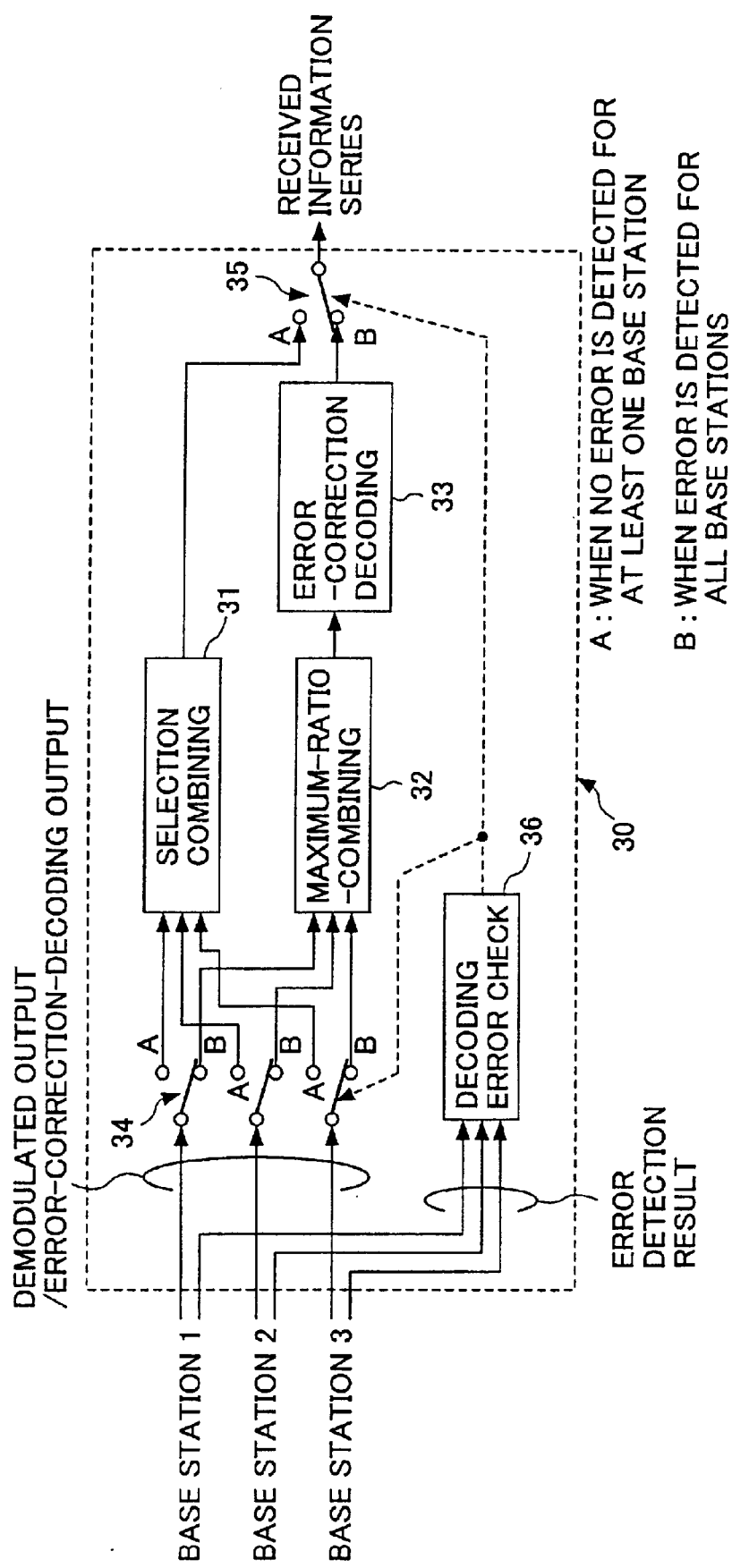

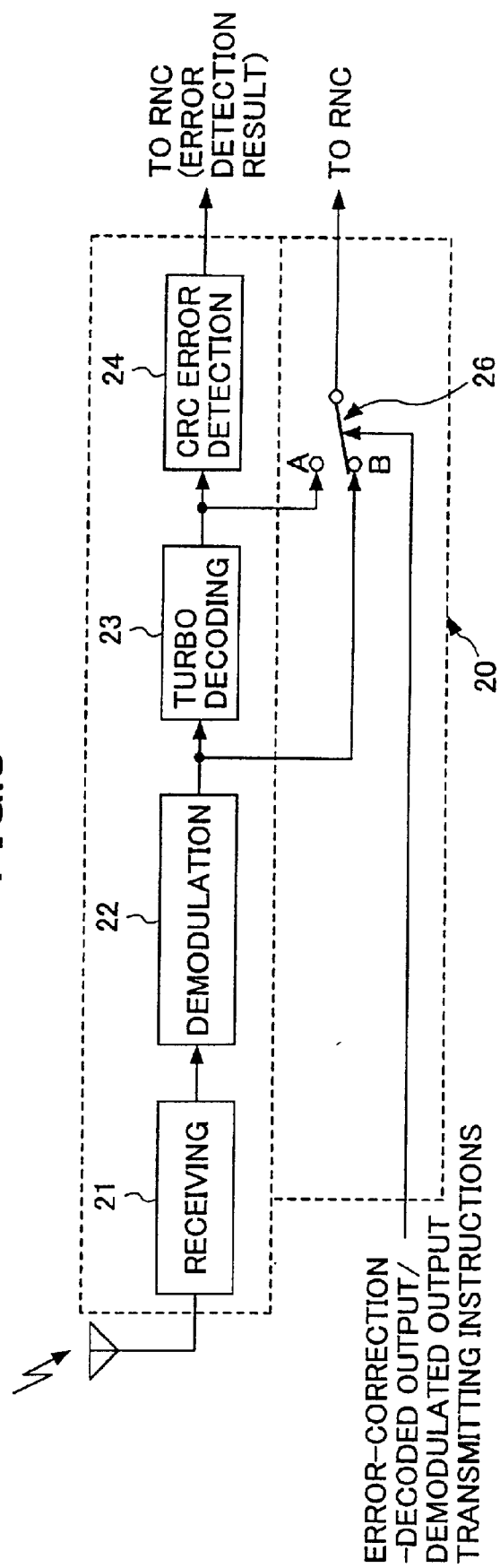

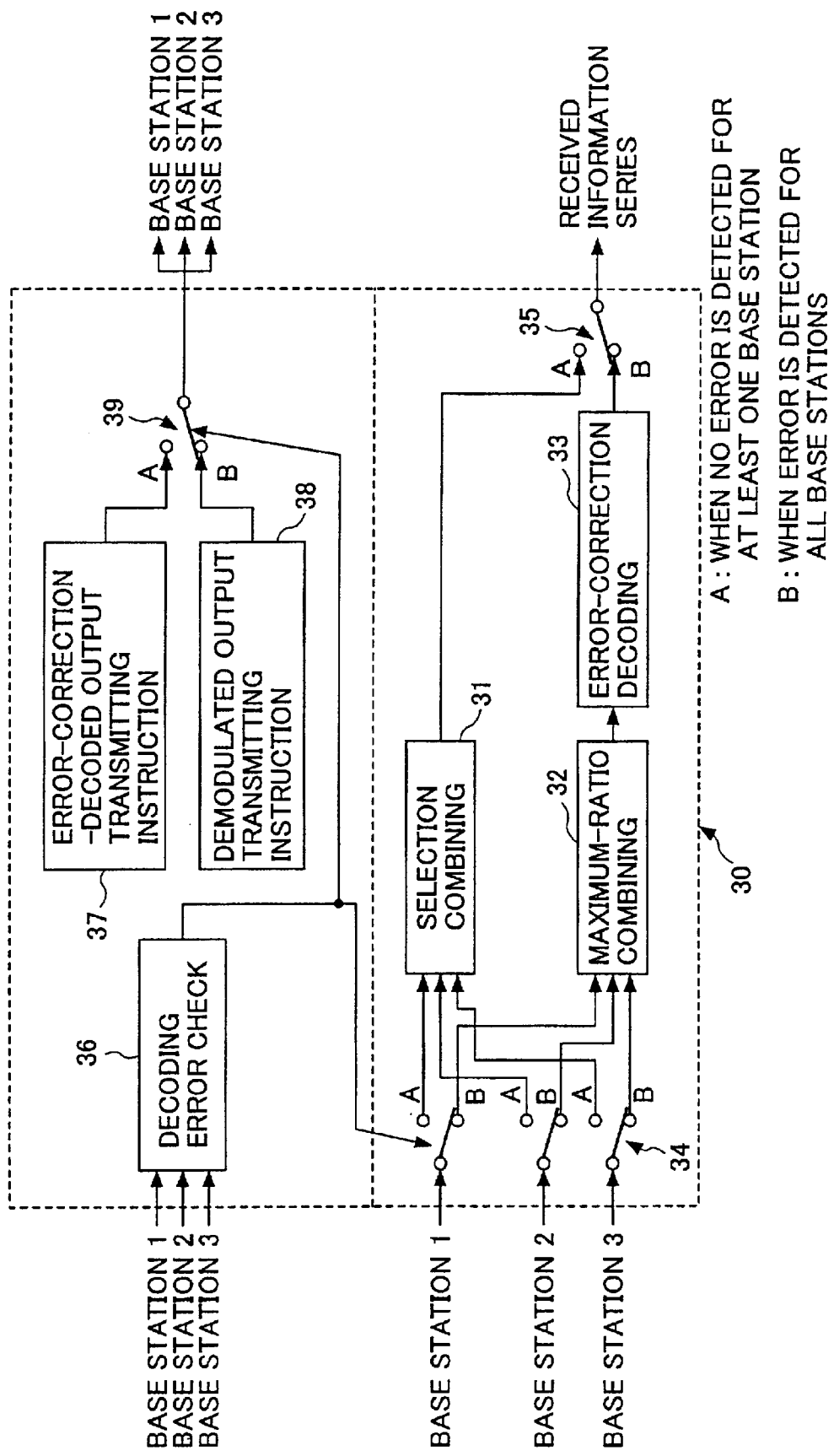

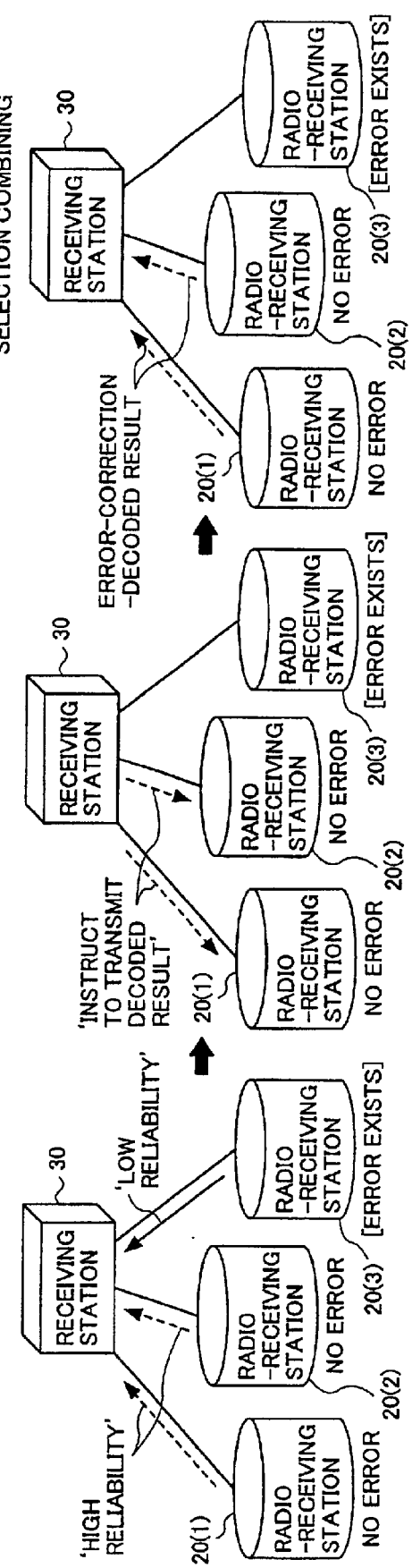

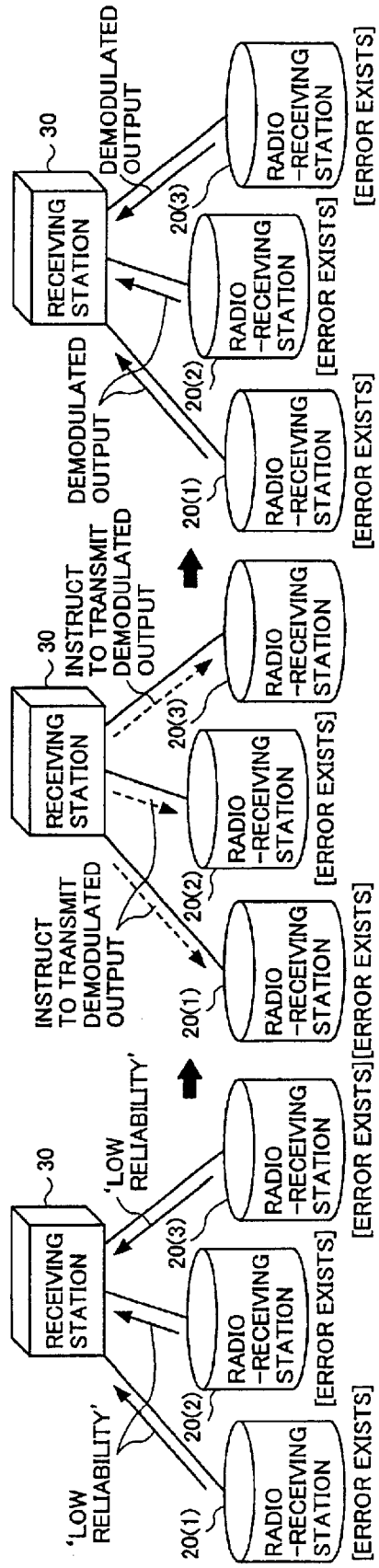

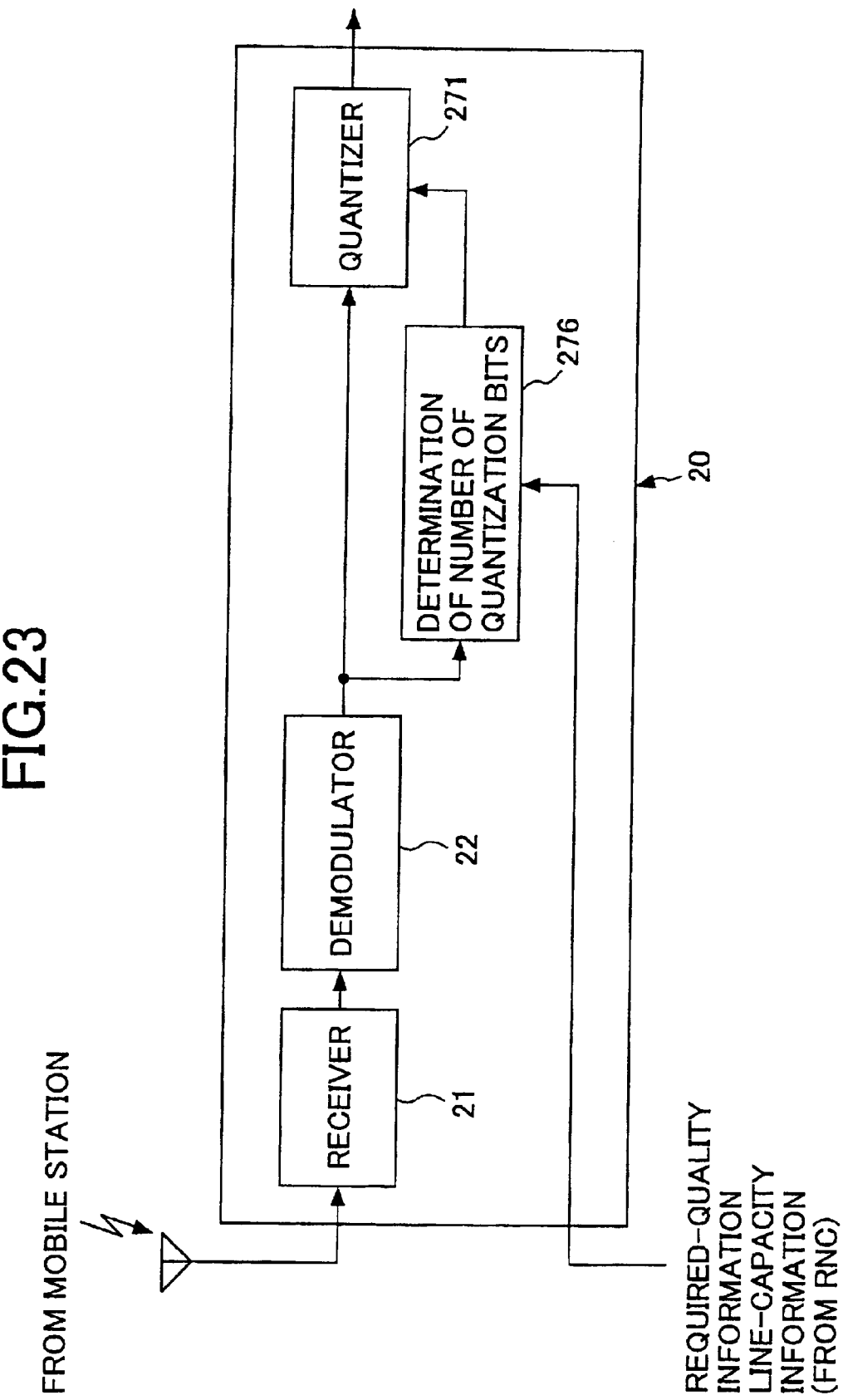

RECEIVED-SIGNAL COMBINING METHOD AND SYSTEM

BACKGROUND OF THE INVENTION

1. Field of the Invention

The present invention relates to a received-signal combining method and system, and, in particular, to a received-signal combining method and system for receiving signals provided from a radio-transmitting station by a plurality of radio-receiving stations, and generating a reception signal based on the signals provided by the plurality of radio-receiving stations.

Further, the present invention relates to a radio-receiving station and receiving station used in such a received-signal generating method.

2. Description of the Related Art

In the related art, for example, a radio-transmitting system such as a mobile communication system rendering uplink site diversity includes, as shown in FIG. 1, a plurality of radio-receiving stations 2 (for example, base stations) are connected to a receiving station 3 (for example, control station), and, a radio-transmitting station 1 (for exmaple, a mobile set) is connected with the plurality of radio-receiving stations 2 via radio transmission paths, and renders communication therewith. In such a radio-transmitting system, each radio-receiving station 2 receives, from the radio-transmitting station 1, radio waves transmitted after having undergone respective processes such as error-correction coding, modulation and so forth, and, then, demodulates it and renders error-correction decoding thereon, and, then, transmits the result thereof to the receiving station 3. Then, the receiving station 3 generates a reception signal by rendering selection combining on the error-correction decoding results provided from the respective radio-receiving stations 2.

By employing such a radio-transmitting system, it is possible to reduce degradation in quality of the reception signal obtained by the receiving station 3 to the utmost, even when transmission characteristics of the radio transmission paths between the radio-transmitting station 1 and radio receiving stations 2 are degraded due to shadowing or the like.

Further, in such a radio-transmitting system, it can be considered to transmit the demodulated output of each radio-receiving station 2 without performing error-correction decoding thereon to the receiving station 3, and, the receiving station 3, after performing maximum ratio combining on the thus-obtained signals, performs error-correction decoding. By such a method, it is possible to further improve the quality of the reception signal.

However, in this method, because the demodulated outputs of the radio-receiving stations 2 are transmitted between the radio-receiving stations 2 and the receiving station 3, the amount of information transmitted therebetween is large. Thereby, it is necessary to set a large transmission capacity of the transmission paths (wired or radio) therebetween.

SUMMARY OF THE INVENTION

Accordingly, a first object of the present invention is to provide a received-signal combing method and system by which it is possible to reduce the amount of information transmitted between each radio-receiving station (2) and receiving station (3), and, also, to obtain the reception signal having a high quality in the receiving station.

A second object of the present invention is to provide a radio-receiving station (2) which can be used in such a received-signal combing method.

A third object of the present invention is to provide a receiving station (3) which can be used in such a received-signal combing method.

In order to achieve the above-mentioned first object, a received-signal combining method of transmitting signals, based on a signal having undergone error-correction coding and transmitted from a radio-transmitting station, to a receiving station from a plurality of radio-receiving stations, and generating a reception-information sequence based on the thus-transmitted signals, by the receiving station, comprises the steps of:

a) each radio-receiving station rendering error-correction decoding and error detection processing on the signal transmitted from the radio-transmitting station, and transmitting the error-correction-decoding result to the receiving station when no error is detected by the error detection processing; and b) the receiving station combining the received error-correction-decoding result according to a first algorithm when receiving the error-correction-decoding result from any radio-receiving station, and, thus, generating the reception-information sequence.

Thereby, when no error is detected in any radio-receiving stations, the error-correction-decoding results are transmitted to the receiving station from the radio-receiving stations. Then, the thus-received error-correction-decoding results are combined according to the first algorithm, and thus, the reception-information sequence is generated.

A process rendered when an error is detected in each radio-receiving station is not particularly limited. For example, a radio-receiving station at which an error is detected may transmit no signal to the receiving station. Further, in a standpoint of further improving the quality of the reception-information sequence obtained in the receiving station when an error is detected in each of the radio-receiving stations, each radio-receiving station may transmit the signal before undergoing the error-correction decoding processing when an error is detected in the error detection processing; and when receiving the signals before undergoing the error-correction decoding processing from all the radio-receiving stations, the receiving station may combine the thus-received signals according to a second algorithm, then, renders error-correction decoding processing thereon, and, thus, generates the reception-information sequence.

Further, in order to achieve the above-mentioned first object, a received-signal combining method of transmitting signals, based on a signal having undergone error-correction coding and transmitted from a radio-transmitting station, to a receiving station from a plurality of radio-receiving stations, and generating a reception-information sequence based on the thus-transmitted signals, by the receiving station, comprises the steps of:

a) each radio-receiving station rendering error-correction decoding and error detection processing on the signal transmitted from the radio-transmitting station, and transmitting first information according to the error detection result or second information indicating a state in that an error degree is higher than that of the first information to the receiving station;

b) when receiving the first information from any radio-receiving station, the receiving station transmitting first signal transmitting instructions to the radio-receiving station, and, when receiving the second information from all the radio-receiving stations, the receiving station transmitting second signal transmitting instructions to all the radio-receiving stations;

c) when receiving the first signal transmitting instructions from the receiving station, each radio-receiving station transmitting the error-correction-decoding result to the receiving station, but when receiving the second signal transmitting instructions from the receiving station, each radio-receiving station transmitting the signal before undergoing the error-correction decoding processing;

d) when receiving the error-correction-decoding results from any radio-receiving stations, the receiving station combining the thus-received results according to a first algorithm so as to generate the reception-information sequence, but, when receiving the signals before undergoing the error-correction decoding from all the radio-receiving stations, the receiving station combining the thus-received signals according to a second algorithm and then rendering error-correction decoding processing thereon so as to generate the reception-information sequence.

Thereby, each radio-receiving station reports either the first information or second information to the receiving station according to the error detection result. Then, when receiving the first information from any radio-receiving station, the receiving station transmits the first signal transmitting instructions to the radio-receiving stations which transmitted the first information. When receiving the first signal transmitting instructions from the receiving station, each radio-receiving station transmits the error-correction-decoding result to the receiving station. Then, when receiving the error-correction-decoding results from the radio-receiving stations, the receiving station combines the thus-received results according to a first algorithm so as to generate the reception-information sequence, When receiving the above-mentioned second information from all the radio-receiving stations, the receiving station transmits the second signal transmitting instructions to all the radio-receiving stations. When receiving the second signal transmitting instructions from the receiving station, each radio-receiving station transmits the signal before undergoing the error-correction decoding processing to the receiving station. Then, when receiving the signals before undergoing the error-correction decoding from all the radio-receiving stations, the receiving station combines the thus-received signals according to a second algorithm and then renders error-correction decoding processing so as to generate the reception-information sequence.

The above-mentioned first and second information is not particularly limited as long as the information indicates degrees of error (degree of reliability). For exmaple, the first information indicates that no error is detected (high reliability), and the second information indicates that an error is detected (low reliability).

In a standpoint of providing an effective method in particular for a case where turbo coding is used as the above-mentioned error-correction coding, each radio-receiving station may receive a signal obtained through systematic coding processing rendered as error-correction coding processing by the radio-transmitting station, render error detection processing when rendering every predetermined times of iterative processing of error-correction decoding processing, and transmit first information according to the result of the error detection processing, or second information indicating a state of an error degree higher than that of the first information, to the receiving station;

when receiving the second information from all the radio-receiving stations, the receiving station may send instructions to all the radio-receiving stations to continue the decoding processing, but, when receiving the first information from any radio-receiving station, the receiving station may send instructions to the radio-receiving station to transmit the error-correction-decoding result; and when receiving the instructions to continue the decoding processing, each radio-receiving station continues the iterative processing of the error-correction decoding processing, but, when receiving the instructions to transmit the error-correction-decoding result, each radio-receiving station transmits the error-correction-decoding result to the receiving station.

A coding algorithm in the above-mentioned systematic coding is not particularly limited, and, for exmaple, a turbo coding may be used therefor. Further, the error-correction decoding corresponds to the above-mentioned systematic coding, processing is rendered iteratively, and the error-correction-decoding result is output each time the processing is finished. When turbo coding is used as the systematic coding as mentioned above, this error-correction decoding is turbo decoding.

In a standpoint of preventing useless repetition of processing in error-correction decoding in each radio-receiving station, when receiving the first information from any radio-receiving station, the receiving station may send to the other each radio-receiving station instructions to terminate the error-correction decoding processing; and when receiving the instructions to terminate the error-correction decoding processing, each radio-receiving station may terminate the iterative processing of the error-correction decoding processing.

In a standpoint of enabling generation of the reception-information sequence having a high quality, each radio-receiving station may detect a reception SIR (Signal-to-interference ratio) on reception of the signal from the radio-transmitting station, and transmit the thus-detected reception SIR to the receiving station when transmitting the error-correction-decoding result; and the receiving station may combine the error-correction-decoding results determined based on the thus-received reception SIR, according to the first algorithm.

Further, in a standpoint of enabling efficient quantization at a time of each radio-receiving station quantizing the signal before undergoing error-correction decoding and transmitting it to the receiving station, when transmitting a signal obtained through the quantization of an output of a demodulator to the receiving station as the signal before undergoing the error-correction decoding processing, each radio-receiving station may produce a quantization table corresponding to two-dimensional information comprising an I-channel output signal and a Q-channel output signal of the demodulator, and render the quantization of the output of the demodulator referring to the quantization table.

Further, when transmitting a signal obtained through quantization of an output of a demodulator to the receiving station as the signal before undergoing the error-correction decoding processing, each radio-receiving station may produce a quantization table corresponding to information comprising successive I-channel output signals and Q-channel output signals of the demodulator, and render the quantization of the output of the demodulator referring to the quantization table.

Further, when transmitting a signal obtained through quantization of an output of a demodulator to the receiving station as the signal before undergoing the error-correction decoding processing, each radio-receiving station may produce a quantization table successively by using average and dispersion calculated from the output signal of the demodulator, and render the quantization of the output of the demodulator referring to the quantization table.

Further, when transmitting a signal obtained through quantization of a signal before undergoing the error-correction decoding processing to the receiving station, each radio-receiving station may determine the number of quantization bits based on a reception SIR predicted from the signal before undergoing the error-correction decoding processing, and render quantization of the signal before undergoing the error-correction decoding processing by using the thus-determined number of quantization bits.

Further, when receiving a signal obtained through systematic coding processing rendered as error-correction coding processing by the radio-transmitting station, and transmitting the signal obtained through quantization of a signal before undergoing the error-correction decoding processing comprising iterative processing, each radio-receiving station may produce quantization tables different for respective ones of a system part and a redundancy part of the signal before undergoing the error-correction decoding processing, and render quantization of the system part and redundancy part of the signal before undergoing the error-correction decoding processing referring to the respective ones of the thus-produced quantization tables.

Further, when transmitting a signal obtained through quantization of a signal before undergoing the error-correction decoding processing to the receiving station, each radio-receiving station may determine the number of quantization bits according to a state of an amount of information transmitted between the receiving station and the radio-receiving station, and render quantization of the signal before undergoing the error-correction decoding processing by using the thus-determined number of quantization bits.

Further, when transmitting a signal obtained through quantization of a signal before undergoing the error-correction decoding processing to the receiving station, each radio-receiving station may determine the number of quantization bits according to a communication quality requested by the receiving station, and render quantization of the signal before undergoing the error-correction decoding processing by using the thus-determined number of quantization bits.

Further, in order to achieve the above-mentioned first object, according to the present invention, in a received-signal combining system for transmitting signals, based on a signal having undergone error-correction coding and transmitted from a radio-transmitting station, to a receiving station from a plurality of radio-receiving stations, and generating a reception-information sequence based on the thus-transmitted signals, by the receiving station, each radio-receiving station comprises a first error-correction decoding part rendering error-correction decoding on the signal transmitted from the radio-transmitting station, an error detecting part rendering error detection processing on the thus-received signal, and a first transmission control part transmitting the error-correction-decoding result obtained by the error-correction decoding part to the receiving station when no error is detected by the error detecting part; and the receiving station comprises a first combining part combining the received error-correction-decoding result according to a first algorithm when receiving the error-correction-decoding result from any radio-receiving station, and, thus, generating the reception-information sequence.

Further, according to the present invention, in a received-signal combining system for transmitting signals, based on a signal having undergone error-correction coding and transmitted from a radio-transmitting station, to a receiving station from a plurality of radio-receiving stations, and generating a reception-information sequence based on the thus-transmitted signals, by the receiving station, each radio-receiving station comprises a first error-correction decoding part rendering error-correction decoding on the signal transmitted from the radio-transmitting station, an error detecting part rendering error detection processing on the thus-received signal and a error-state-information transmitting part transmitting first information according to the error detection result of the error detecting part, or second information indicating a state in that an error degree is higher than that of the first information, to the receiving station;

the receiving station comprises a first signal transmitting instructing part and a second signal transmitting instructing part, wherein, when the receiving station receives the first information from any radio-receiving station, the first signal transmitting instructing part transmits first signal transmitting instructions to the radio-receiving station, and, when the receiving station receives the second information from all the radio-receiving stations, the second signal transmitting instructing part transmits second signal transmitting instructions to all the radio-receiving stations;

each radio-receiving station further comprises a first transmission control part and a second transmission control part, wherein, when the radio-receiving station receives the first signal transmitting instructions from the receiving station, the first transmission control part transmits the error-correction-decoding result to the receiving station, but when the radio-receiving station receives the second signal transmitting instructions from the receiving station, the second transmission part transmits the signal before undergoing the error-correction decoding processing; and the receiving station further comprises a first combining part, a second combining part and a second error-correction decoding part, wherein, when the receiving station receives the error-correction-decoding results from any radio-receiving stations, the first combining part combines the thus-received results according to a first algorithm so as to generate the reception-information sequence, but, when the receiving station receives the signals before undergoing the error-correction decoding from all the radio-receiving stations, the second combining part combines the thus-received signals according to a second algorithm and the second error-correction decoding part renders error-correction decoding processing thereon so as to generate the reception-information sequence.

Thus, when no error is detected, the error-correction-decoding results having relatively small amounts of information are transmitted from the radio-receiving stations to the receiving station, which then combines the thus-received error-correction-decoding results, and generates the reception-information sequence. Accordingly, it is possible to obtain the reception signal having a higher quality with keeping the amount of information transmitted between each radio-receiving station and receiving station as small as possible.

Further, in order to achieve the above-mentioned second object, according to the present invention, a radio-receiving station used in a received-signal combining method of transmitting signals, based on a signal having undergone error-correction coding and transmitted from a radio-transmitting station, to a receiving station from the plurality of radio-receiving stations, and generating a reception-information sequence based on the thus-transmitted signals, by the receiving station, comprises:

an error-correction decoding part rendering error-correction decoding on the signal transmitted from the radio-transmitting station;

an error detecting part rendering error detection processing on the thus-received signal; and a first transmission control part transmitting the error-correction-decoding result obtained by the error-correction decoding part to the receiving station when no error is detected by the error detecting part, so that the receiving station can combine the received error-correction-decoding result according to a first algorithm when receiving the error-correction-decoding result from the radio-receiving station, and, thus, generate the reception-information sequence.

Further, according to the present invention, a radio-receiving station used in a received-signal combining method of transmitting signals, based on a signal having undergone error-correction coding and transmitted from a radio-transmitting station, to a receiving station from the plurality of radio-receiving stations, and generating a reception-information sequence based on the thus-transmitted signals, by the receiving station, comprises:

an error-correction decoding part rendering error-correction decoding on the signal transmitted from the radio-transmitting station;

an error detecting part rendering error detection processing on the thus-received signal;

an error-state-information transmitting part transmitting first information according to the error detection result of the error detecting part, or second information indicating a state in that an error degree is higher than that of the first information, to the receiving station, so that, when receiving the first information from any radio-receiving station, the receiving station can transmit first signal transmitting instructions to the radio-receiving station, and, when receiving the second information from all the radio-receiving stations, the receiving station can transmit second signal transmitting instructions to all the radio-receiving stations; and a first transmission control part and a second transmission control part, wherein, when the radio-receiving station receives the first signal transmitting instructions from the receiving station, the first transmission control part transmits the error-correction-decoding result to the receiving station, but when the radio-receiving station receives the second signal transmitting instructions from the receiving station, the second transmission part transmits the signal before undergoing the error-correction decoding processing, so that, when receiving the error-correction-decoding results from any radio-receiving stations, the receiving station can combine the thus-received results according to a first algorithm so as to generate the reception-information sequence, but, when receiving the signals before undergoing the error-correction decoding from all the radio-receiving stations, the receiving station can combine the thus-received signals according to a second algorithm and render error-correction decoding processing thereon so as to generate the reception-information sequence.

Thus, it is possible to provide the radio-receiving stations which can be used in the above-mentioned received-signal combining method and system.

In order to achieve the above-mentioned third object, according to the present invention, a receiving station used in a received-signal combining method of transmitting signals, based on a signal having undergone error-correction coding and transmitted from a radio-transmitting station, to the receiving station from a plurality of radio-receiving stations, and generating a reception-information sequence based on the thus-transmitted signals, by the receiving station, comprises:

a first combining part combining received error-correction-decoding result according to a first algorithm when receiving the error-correction-decoding result from any radio-receiving station, and, thus, generating the reception-information sequence; and a second combing part and an error-correction decoding part, wherein, when the receiving station receives signals before undergoing the error-correction decoding processing from all the radio-receiving stations, the second combining part combines the thus-received signals according to a second algorithm, the error-correction decoding part renders error-correction decoding processing, and, thus, generates the reception-information sequence.

Further, according to the present invention, a receiving station used in a received-signal combining method of transmitting signals, based on a signal having undergone error-correction coding and transmitted from a radio-transmitting station, to a receiving station from a plurality of radio-receiving stations, and generating a reception-information sequence based on the thus-transmitted signals, by the receiving station, comprises:

a first signal transmitting instructing part and a second signal transmitting instructing part, wherein, when the receiving station receives first information according to a result of error detection from any radio-receiving station, the first signal transmitting instructing part transmits first signal transmitting instructions to the radio-receiving station, and, when the receiving station receives second information, which indicates a state of a degree of error higher than that of the first information, from all the radio-receiving stations, the second signal transmitting instructing part transmits second signal transmitting instructions to all the radio-receiving stations; and a first combining part, a second combining part and an error-correction decoding part, wherein, when the receiving station receives the error-correction-decoding results from any radio-receiving stations in response to the first signal transmitting instructions, the first combining part combines the thus-received results according to a first algorithm so as to generate the reception-information sequence, but, when the receiving station receives the signals before undergoing the error-correction decoding in response to the second signal transmitting instructions from all the radio-receiving stations, the second combining part combines the thus-received signals according to a second algorithm and the error-correction decoding part renders error-correction decoding processing thereon so as to generate the reception-information sequence.

Thus, it is possible to provide the receiving station which can be used in the above-mentioned received-signal combining method and system.

Other objects and further features of the present invention will become more apparent from the following detailed description when read in conjunction with the accompanying drawings.

BRIEF DESCRIPTION OF THE DRAWINGS

FIG. 3 is a block diagram showing an exmaple of a configuration of a transmitting part of a mobile set shown in FIG. 2;

FIG. 4 is a block diagram showing an example of a configuration of a receiving part of each base station shown in FIG. 2;

FIG. 5 shows a block diagram showing an exmaple of a configuration of a control station (RNC) shown in FIG. 2;

FIG. 8 is a block diagram showing another example of a configuration of the receiving part of each base station shown in FIG. 2;

FIG. 9 shows a block diagram showing another exmaple of a configuration of the control station (RNC) shown in FIG. 2;

FIGS. 10A, 10B, 10C, 11A, 11B and 11C illustrate a third exmaple of site-diversity reception;

FIG. 23 is a block diagram showing another example of a configuration of the receiving part of each base station shown in FIG. 2.

DETAILED DESCRIPTION OF THE PREFERRED EMBODIMENT

Figure 1:
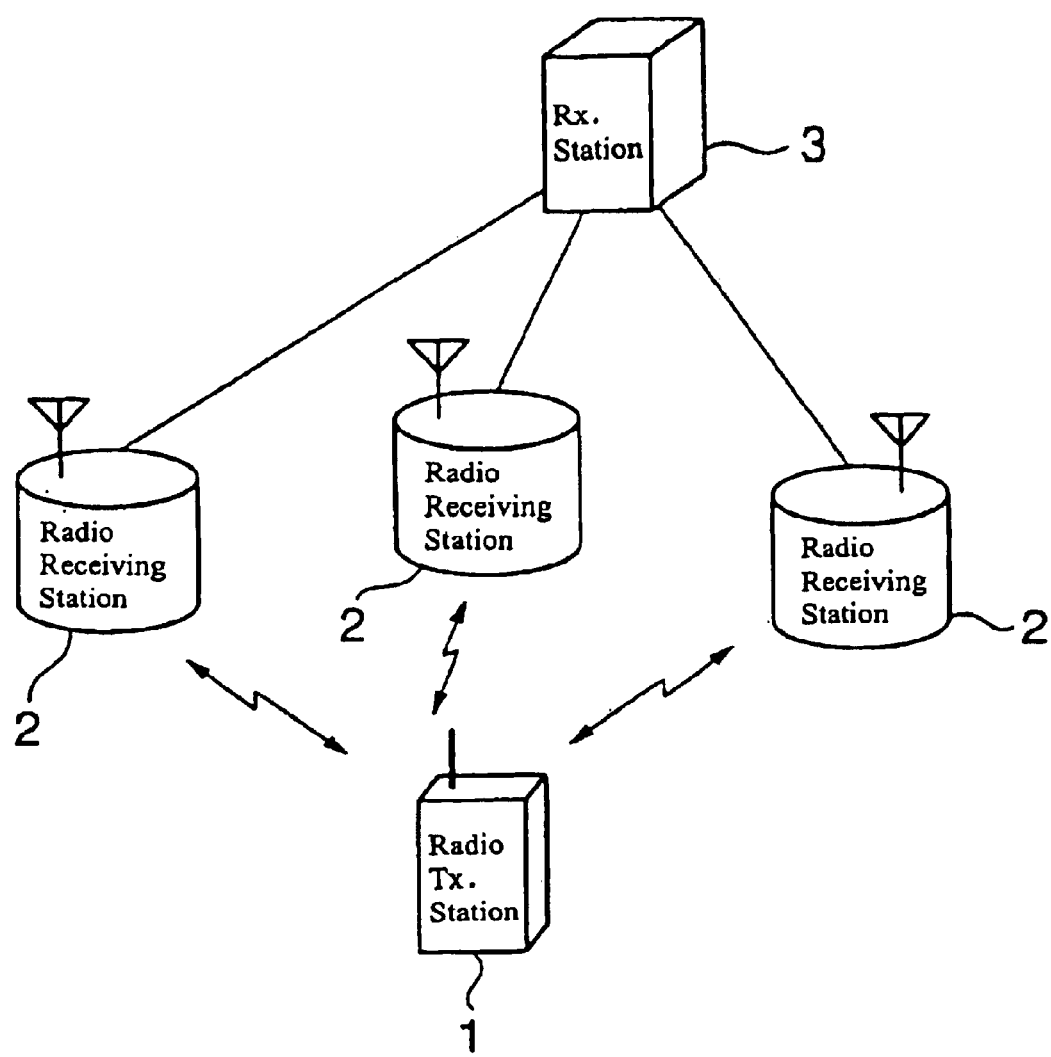
FIG. 1 is a block diagram showing an example of a basic configuration of a radio-transmitting system rendering site-diversity reception.
Figure 2:
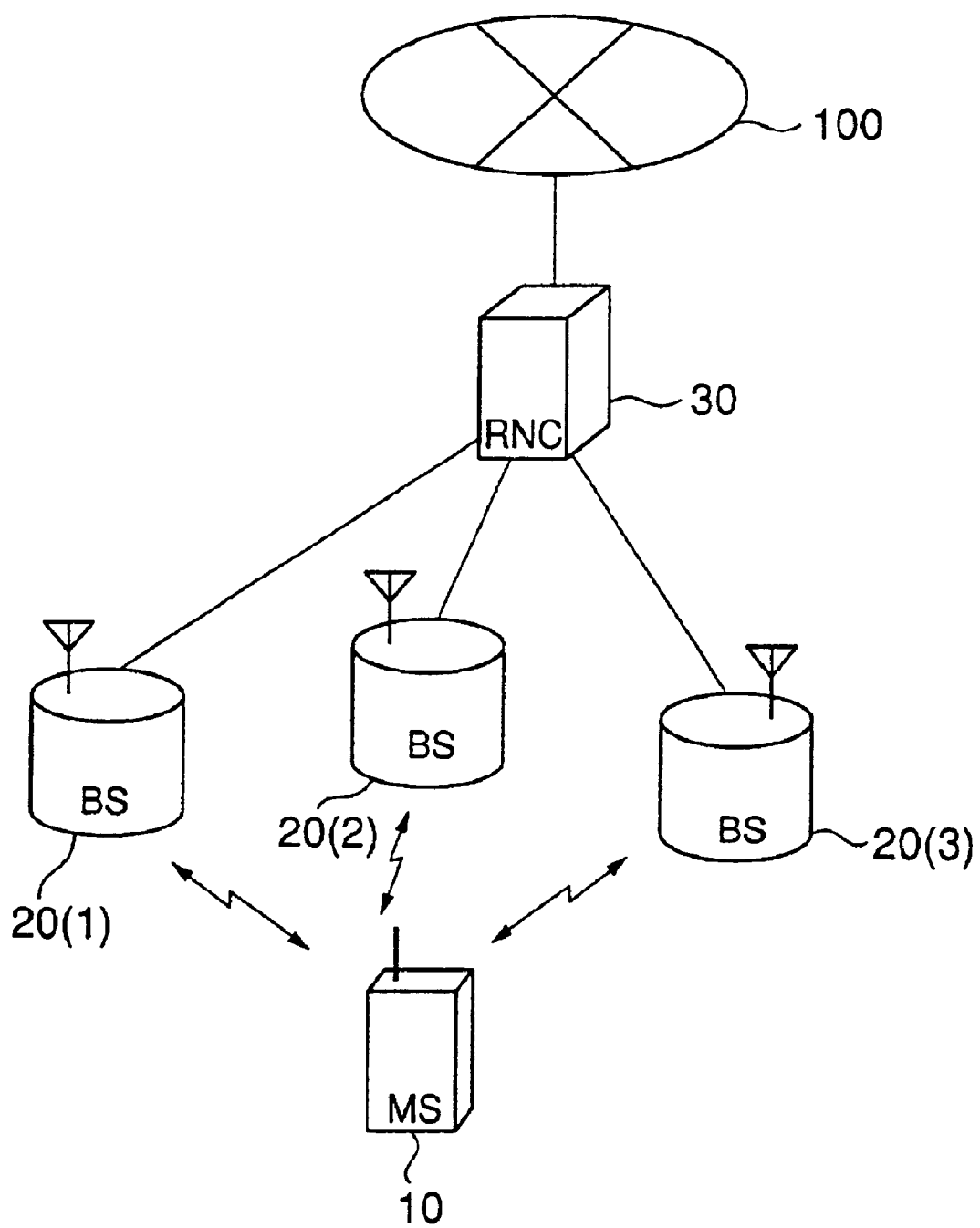
FIG. 2 is a block diagram showing an exmaple of a configuration of a radio-transmitting system in a first embodiment of the present invention.

FIG. 2 shows a basic configuration of a radio-transmitting system in one embodiment of the present invention. In the embodiment, as shown in the figure, the radio-transmitting system is achieved as a mobile communication system by which uplink site diversity can be rendered.

In FIG. 2, a mobile set (or mobile station, corresponding to a radio-transmitting station) 10 communicates with a plurality of base stations (corresponding to radio-receiving stations) 20(1), 20(2) and 20(3) via radio-transmission paths, respectively. Each base stations 20(1), 20(2), 20(3) is connected to a control station (corresponding to a receiving station, and referred to as an RNC) 30 via wire. The RNC 30 is then connected to a network 100, and communicates with another communication unit via the network.

The mobile set 10 has a transmitting part such as that shown in FIG. 3, for example.

In FIG. 3, the transmitting part of the mobile set 10 includes a CRC-coding circuit 11, a turbo-coding circuit 12, a modulator 13 and a transmitter 14. The CRC-coding circuit 11 renders CRC coding on a transmitting information sequence which represents information to be transmitted. The turbo-coding circuit 12 renders turbo coding, as error-correction coding, on the information sequence having undergone the CRC coding. The information sequence obtained from the CRC coding and turbo coding being rendered on the transmitting information sequence is modulated by the modulator 13, and is transmitted through the transmitter 14.

Each base station 20(i) (i=1 through 3) has a receiving part such as that shown in FIG. 4, for example.

In FIG. 4, the receiving part of the base station 20(i) includes a receiver 21, a demodulator 22, a turbo-decoding circuit 23, a CRC-error-detecting circuit 24 and a switch circuit 25. The signal from the above-mentioned mobile set 10 is received by the receiver 21, and is demodulated by the demodulator 22. The turbo-decoding circuit 23 renders turbo decoding (error-correction decoding) according to an algorithm corresponding to the above-mentioned turbo coding (error-correction coding) on the demodulated output of the demodulator 22. The CRC-error-detecting circuit 24 renders CRC error detection on the information sequence obtained from the turbo-decoding circuit 23, according to an algorithm corresponding to the above-mentioned CRC coding. The output of the CRC-error-detecting circuit 24 is provided to the RNC 30 as an error detection result.

The switch circuit 25 selects either the demodulated output from the demodulator 22 or the error-correction-decoded output from the turbo-decoding circuit 23, according to the error detection result from the CRC-error-detecting circuit 24. When the above-mentioned error detection result is that 'no error is detected', the switch circuit 25 selects the error-correction-decoded output from the turbo-decoding circuit 23. When the above-mentioned error detection result is that 'an error is detected', the switch circuit 25 selects the demodulated output from the demodulator 22. The signal thus selected by the switch circuit 25 is provided to the RNC 30.

The RNC 30 is configured as shown in FIG. 5, for exmaple.

As shown in FIG. 5, the RNC 30 includes a selection-combining circuit 31, a maximum-ratio-combining circuit 32, an error-correction decoding circuit 33, a first switch circuit 34, a second switch circuit 35 and an error checking circuit 36. The signal from each base station 20(i) is provided to either the selection-combining circuit 31 or the maximum-ratio-combining circuit 32 via the first switch circuit 34. The error checking circuit 36 determines whether or not a decoding error exists in each base station 20(i), based on the error detection result from the base station 20(i).

The first switch circuit 34 includes a switching unit for each base station 20(i), and each switching unit has a port A connected to the selection-combining circuit 31 and a port B connected to the maximum-ratio-combining circuit 32. The switching unit corresponding to each base station 20(i) for which the error check result of the error checking circuit 36 is that 'no error exists' selects the port A, and the signal (error-correction-decoded output) from this base station 20(i) is provided to the selection-combining circuit 31. On the other hand, the switching unit corresponding to each base station 20(j) for which the error check result of the error checking circuit 36 is that 'an error exists' selects the port B, and the signal (demodulated output) from this base station (i) is provided to the maximum-ratio-combining circuit 32.

The error-correction-decoding circuit 33 renders error-correction decoding on a combined signal output from the maximum-ratio-combining circuit 32, according to an algorithm similar to that of the above-described turbo decoding. Further, the second switch circuit 35 selects, as a reception-information sequence (reception signal) either the output (port A) of the selection-combining circuit 31 or the output (port B) of the error-correction-decoding circuit 33, based on the error check result of the error checking circuit 36. Specifically, when the check result that 'no error exists' is obtained for at least one base station 20(i), the second switch circuit 35 selects, as the reception-information sequence, the output (port A) of the selection-combining circuit 31. However, when the check result that 'an error exists' for each of all the base stations, the second switch circuit 35 selects, as the reception-information sequence, the output (port B) of the error-correction-decoding circuit 33.

A reception-information sequence thus generated by the RNC 30 is transmitted to a terminal, with which communication is made, via the network 100.

Figure 6A:
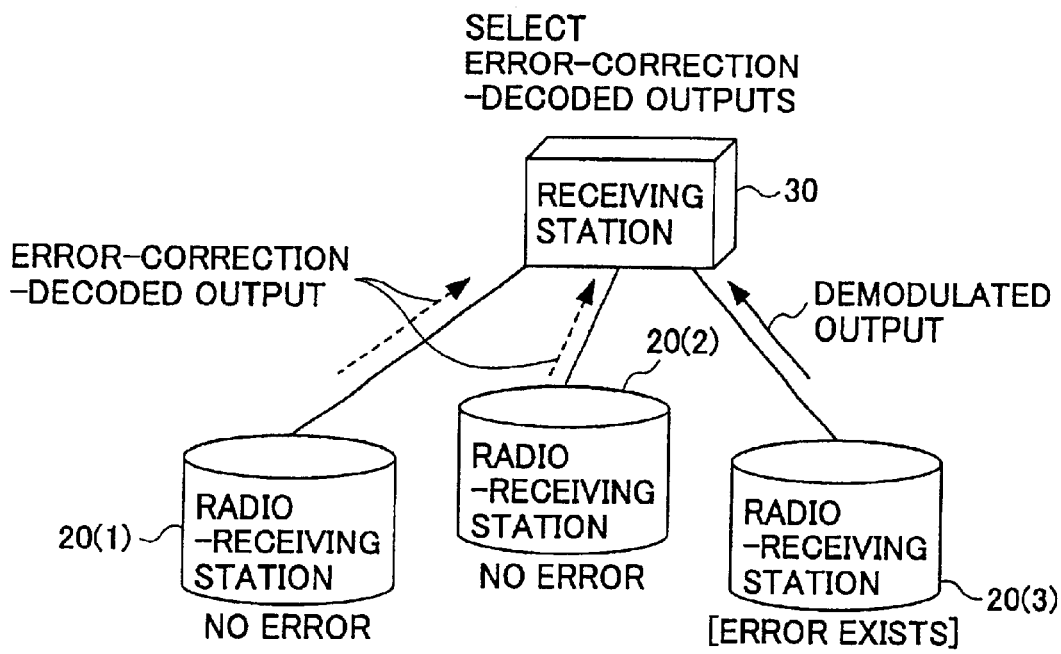
FIGS. 6A and 6B illustrate a first exmaple of site-diversity reception.
Figure 6B:
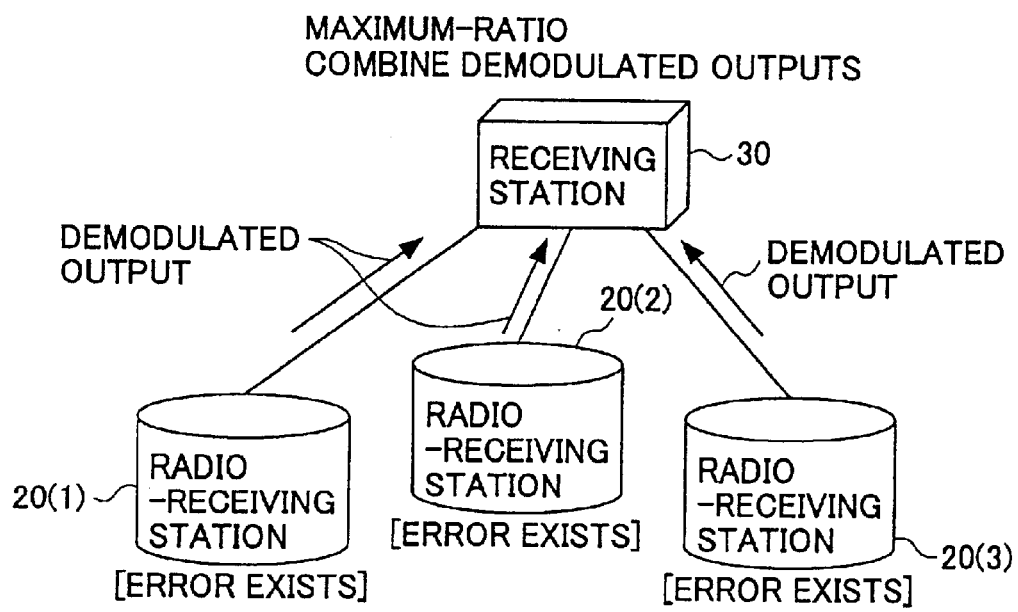

In the radio-transmitting system configured as described above, site-diversity reception shown in FIGS. 6A and 6B is performed for a signal transmitted from the mobile set 10. In FIGS. 6A and 6B, each base station 20(1), 20(2), 20(3) is expressed as a radio-receiving station, and the RNC 30 is expressed as a receiving station (also similar in FIGS. 7A, 7B, 10A, 10B, 10C, 11A, 11B, 11C, 12, 13A, 13B, 14A, 14B and 14C).

When no error is detected by the CRC-error-detecting circuit 24 of at least one base station of the plurality of base stations 20(1), 20(2) and 20(3), the error-correction-decoded outputs from the turbo-decoding circuits 23 are provided to the RNC 30 from the base stations (for example, 20(1) and 20(2)) at each of which no error is detected, as shown in FIG. 6A. On the other hand, from the base station (for example, 20(2)) at which an error is detected, the demodulated output from the demodulator 22 is provided to the RNC 30.

Then, in the RNC 30, the thus-provided error-correction-decoded outputs are combined by the selection-combining circuit 31, and the thus-obtained combined signal is selected as the reception-information sequence there.

On the other hand, when an error is detected by the CRC-error-detecting circuit 24 in each of all the plurality of base stations 20(1), 20(2) and 20(3) each receiving a signal transmitted from the mobile set 10, the demodulated outputs of the demodulators 22 are provided to the RNC 30 from all of the base stations 20(1), 20(2) and 20(3), as shown in FIG. 6B. In the RNC 30, the demodulated outputs provided by all of the base stations 20(1), 20(2) and 20(3) are combined in a maximum-ratio combining manner by the maximum-ratio-combing circuit 22, and the thus-obtained combined signal is decoded in an error-correction decoding manner by the error-correction decoding circuit 33. The thus-obtained error-correction-decoded output is output from the RNC 30 as the reception-information sequence.

By the above-described site-diversity reception, from each base station at which a signal from the mobile set 10 is demodulated normally and no error is detected there, the demodulated output of the demodulator 22 having a large amount of information is not needed to be transmitted to the RNC 30, but merely the error-correction-decoded output having a relatively small amount of information is needed to be transmitted to the RNC 30. Accordingly, it is possible to reduced the amount of information to be transmitted between each base station 20(1), 20(2), 20(3) which is a radio-receiving station and the RNC 30 which is a receiving station.

Further, when no error is detected in at least one base station, the error-correction-decoded outputs from the base stations at each of which no error is detected undergo selection-combining processing in the RNC 30. Accordingly, it is possible to generate the reception-information sequence having a relatively high quality. On the other hand, even when an error is detected in each of all the base stations, because the demodulate outputs (signals before undergoing error-correction decoding) are combined in the maximum-ratio-combining manner and then are decoded in the error-correction decoding manner in the RNC 30, it is possible to generate the reception-information sequence having a relatively high quality, also in this case.

Figure 7A:
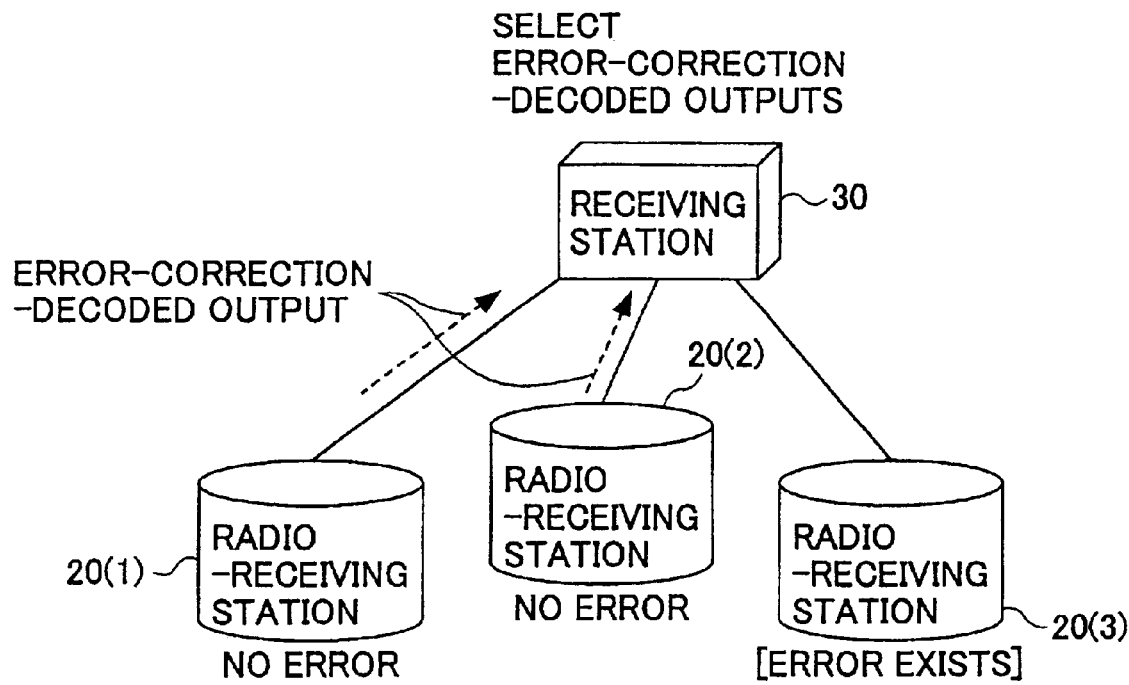
FIGS. 7A and 7B illustrate a second exmaple of site-diversity reception.
Figure 7B:
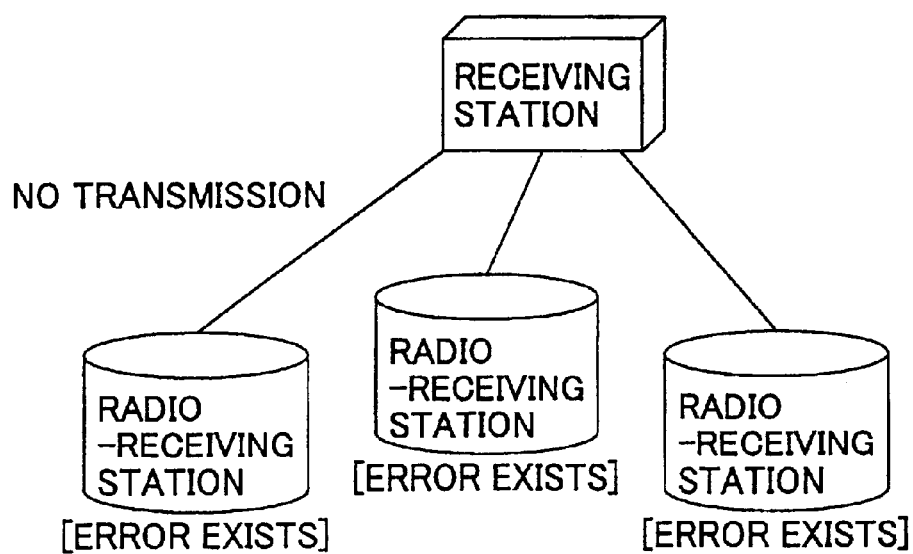

In the above-mentioned radio-transmitting system, site-diversity reception shown in FIGS. 7A and 7B can also be rendered, for example.

In this example, as shown in FIG. 7A, from the base stations at each of which a signal from the mobile set 10 is received normally and no error is detected of the plurality of base stations 20(1), 20(2) and 20(3) each receiving the signal from the mobile station 10, the error-correction-decoded outputs of the turbo-decoding circuits 23 are provided to the RNC 30, as shown in FIG. 7A, which then renders selection combining on the thus-provided error-correction-decoded outputs. On the other hand, from the base station at which the signal from the mobile set 10 is not normally received and an error is detected, no signal is transmitted to the RNC 30. Accordingly, when an error is detected in each of all the base stations 20(1), 20(2) and 20(3), the RNC 30 does not receive any signal from each base station, as shown in FIG. 7B. In this case, the RNC 30 treats the part of information not transmitted as a transmission error.

By such a manner of site-diversity reception, when each base station 20(1), 20(2), 20(3) cannot receive a signal normally and detects an error, no signal is transmitted to the RNC 30 from each base station 20(1), 20(2), 20(3). Accordingly, it is possible to reduce an amount of information transmitted between each base station 20(1), 20(2), 20(3) and the RNC 30. Further, by adjusting the number and/or installation positions of the base stations simultaneously receiving a signal from the mobile set 10, it is possible to reduce situations in that a signal from the mobile set 10 cannot be normally received by any of the base stations. Accordingly, it is possible to reduce an amount of information transmitted between the base stations and RNC 30 with maintaining a high quality of the reception-information sequence obtained in the RNC 30.

It is also possible to configure each base station 20(1), 20(2), 20(3) and the RNC 30 in the radio-transmitting system such as that shown in FIG. 2 as those shown in FIGS. 8 and 9.

As shown in FIG. 8, the base station 20(i) includes, similar to that described above, the receiver 21, demodulator 22, turbo-decoding circuit 23 and CRC-error-detecting circuit 24. Further, the base station 20(i) includes a switch circuit 26 which performs switching operation according to a transmitting-instruction signal given from the RNC 30. When the transmitting-instruction signal for the error-correction-decoded output is input, the switch circuit 26 selects the error-correction-decoded output (port A) from the turbo-decoding circuit 23. When the transmitting-instruction signal for the demodulated output is input, the switch circuit 26 selects the demodulated output (port B) from the demodulator 22. Then, the signal thus selected by the switch circuit 26 is provided to the RNC 30 together with the error detection signal from the CRC-error-detecting circuit 24.

As shown in FIG. 9, the RNC 30 includes, similar to that described above, the selection-combining circuit 31, maximum-ratio-combining circuit 32, error-correction-decoding circuit 33, first switch circuit 34, second switch circuit 35 and error checking circuit 36. This RNC 30 further includes a first transmitting-instruction generating circuit 37 which generates the transmitting-instruction signal for the error-correction-decoded output, a second transmitting-instruction generating circuit 38 which generates the transmitting-instruction signal for the demodulated output, and a switch circuit 39. This switch circuit 39 selects either the transmitting-instruction signal for the error-correction-decoded output from the first transmitting-instruction generating circuit 37 (port A) or the transmitting-instruction signal for the demodulated signal (port B) based on the check result of error detection from the error checking circuit 36.

Specifically, when the check result of the error checking circuit 36 indicates that 'no error is detected', the switch circuit 39 selects the transmitting-instruction signal for the error-correction-decoded output from the first transmitting-instruction generating circuit 37. On the other hand, when the check result of the error checking circuit 36 indicates that 'an error is detected', the switch circuit 39 selects the transmitting-instruction signal for the demodulated signal from the second transmitting-instruction generating circuit 38. The transmitting-instruction signal thus selected by the switch circuit 39 is provided to the switch circuit 26 (see FIG. 8) of the base station for which error checking is rendered, as described above.

Site-diversity reception such as that shown in FIGS. 10A, 10B, 10C, 11A, 11B and 11C is rendered in the radio-transmitting system having the base stations 20(1), 20(2) and 20(3) and RNC 30 configured as described above.

FIGS. 10A, 10B and 10C show a case where at least one base station receives a signal from the mobile set 10 normally and no error is detected there. FIGS. 11A, 11B and 11C show a case where no base station can receive a signal from the mobile set 10 normally and an error is detected in each base station.

In the case shown in FIGS. 10A, 10B sand 10C, the base stations (20(1) and 20(2)) each of which receives the signal from the mobile set 10 normally and in each of which no error is detected by the CRC-error-detecting circuit 24 transmit signals of 'high reliability' only, as the error detection result to the RNC 30 (see FIG. 10A). On the other hand, the base station (20(3)) which cannot receive the signal from the mobile set 10 normally and an error is detected by the CRC-error-detecting circuit 24 there transmits a signal of 'low reliability' only, as the error detection result to the RNC 30 (see FIG. 10A). The RNC 30, having received the signals of 'high reliability' and the signal of 'low reliability', selects the above-mentioned first transmitting-instruction generating circuit 37 (see FIG. 9) and transmits the transmitting-instruction signal for the error-correction-decoded output to the base stations which have transmitted the signals of 'high reliability', but transmits no signal to the base station which has transmitted the signal of 'low reliability' (see FIG. 10B).

Then, each base station which has received the transmitting-instruction signal for the error-correction-decoded output selects the port A (see FIG. 8) by the switch circuit 26 based on this transmitting-instruction signal, and as a result, the error-correction-decoded output of the turbo-decoding circuit 23 is transmitted to the RNC 30 therefrom. On the other hand, the base station which transmitted the signal of 'low reliability' to the RNC 30 as the error detection result does not have any response thereto from the RNC 30, and transmits no signal to the RNC 30 (see FIG. 10C).

The RNC 30, having received the error-correction-decoded output transmitted from each base station which obtained the error detection result of 'high reliability', renders selection combining on the thus-received error-correction-decoded outputs, and thus generates the reception-information sequence.

In the case shown in FIGS. 11A, 11B and 11C, when each of all the base stations 20(1), 20(2) and 20(3) cannot receive the signal from the mobile set 10 normally and detects an error by the CRC-error-detecting circuit 24, each base station 20(1), 20(2), 20(3) transmits the signal of 'low reliability' only, to the RNC 30 as the error detection result (see FIG. 11A). The RNC 30, having received the signals of 'low reliability' from all the base stations, selects the above-mentioned second transmitting-instruction generating circuit 37 (see FIG. 9) and transmits the transmitting-instruction signal for the demodulated output to each of all the base stations (see FIG. 11B).

In each base station, having received the transmitting-instruction signal for the demodulated output, the switch circuit 26 selects the port B based on the transmitting-instruction signal (see FIG. 8), and, as a result, the demodulated output of the demodulator 22 is transmitted to the RNC 30 therefrom. The RNC 30, having received the demodulated outputs from all the base stations at each of which the error detection result of 'low reliability' was obtained, combines these demodulated outputs in the maximum-ratio-combining manner, and, then, renders the process of error-correction-decoding on the thus-obtained signal, and, thus, generates the reception-information sequence.

By such a manner of site-diversity reception, from each base station which can receive the signal from the mobile set 10 normally and each base station which cannot receive the signal from the mobile set 10 normally, only information ('high reliability' and 'low reliability') of the error detection result is transmitted to the RNC 30. When receiving the signal of 'high reliability' from at least one base station, the RNC 30 transmits the transmitting instructions for the error-correction-decoded output to the base station which has transmitted that signal. On the other hand, only when receiving the signal of 'low reliability' from each of all the base stations, the RNC 30 transmits the transmitting instructions for the demodulated output to all the base stations. Then, each base station, after transmitting the above-mentioned information indicating the error detection result to the RNC 30, transmits to the RNC 30 the error-correction-decoded output according to the transmitting instructions when receiving the transmitting instructions for the errorcorrection-decoded output, but transmits to the RNC 30 the demodulated output according to the transmitting instructions when receiving the transmitting instructions for the demodulated output.

Accordingly, it is possible to reduce cases where the demodulated outputs having relatively large amounts of information are transmitted between each base station 20(1), 20(2), 20(3) and the RNC 30 to the utmost, and, thereby, to reduce an amount of information transmitted therebetween.

Figure 12:
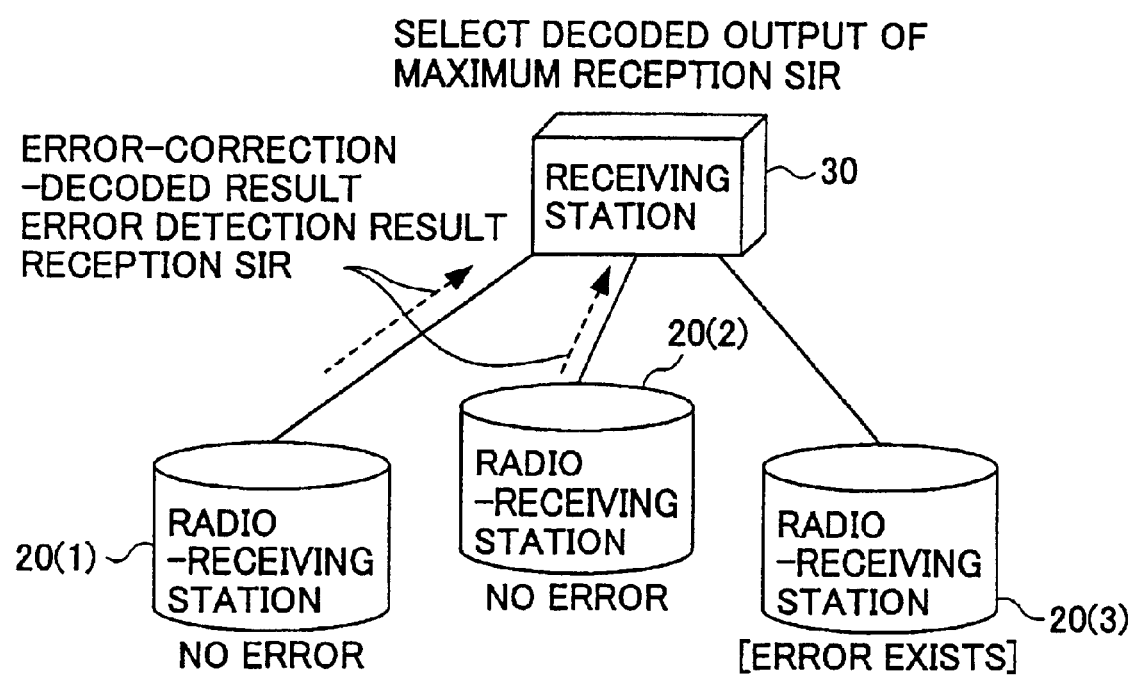
FIG. 12 illustrates a fourth exmaple of site-diversity reception.

By employing CRC coding as an error detecting method for a received signal from the mobile set 10, it is possible to render error detection at high accuracy. However, the probability of error detection will not become 0%. In consideration of such a situation, it is preferable that, as shown in FIG. 12, a reception SIR (Signal-to-Interference Ratio) in communication with the mobile set 10 is transmitted to the RNC 30 together with the error detection result in each base station, for example. In this case, the RNC 30, having received the reception SIR together with the error detection results, generates the reception-information sequence by rendering selection combining on the error-correction-decoded outputs from the base stations for which the reception SIR is maximum.

The base station for which the reception SIR is maximum can receive a signal from the mobile set 10 more positively (the probability of error detection is very low). Accordingly, even if error detection occurs in the base station for which the reception SIR is low, it is possible to prevent degradation in quality of the reception-information sequence obtained in the RNC 30.

Figure 13:
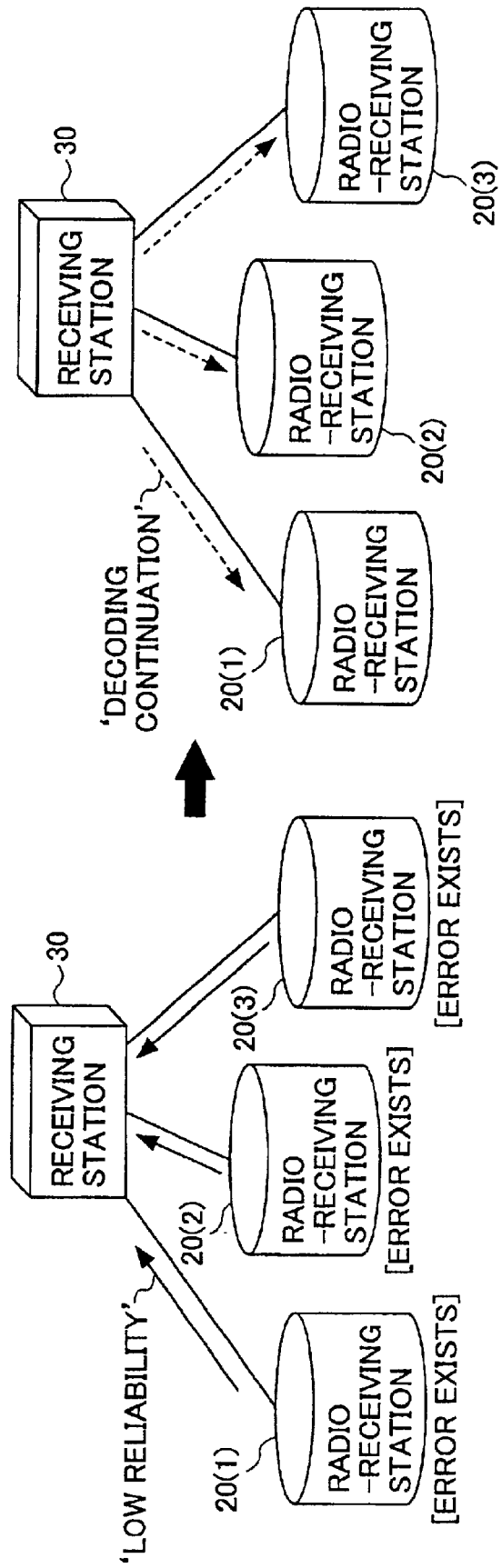
FIGS. 13A, 13B, 14A, 14B and 14C illustrate a fifth exmaple of site-diversity reception.

In a case where turbo coding is used as error-correction coding in the mobile set 10 and turbo decoding is used as error-correction decoding in each base station 20(1), 20(2), 20(3) as described above, iterative processing is rendered in the turbo decoding processing in each base station 20(1), 20(2), 20(3). In this case, it is possible that, every predetermined number of times of the iterative processing, each base station renders CRC-error detection on the error-correction-decoded output of the thus-rendered processing, and reports the error detection result of the CRC-error detection to the RNC 30. Then, in a condition in which each of all of the error detection results reported by the respective base stations is of 'low reliability' as shown in FIG. 13A, the RNC 30 sends instructions of 'decoding continuation' to each base station 20(1), 20(2), 20(3) as shown in FIG. 13B. Each base station 20(1), 20(2), 20(3) having received the instructions of 'decoding continuation' then continues the iterative processing by the turbo-decoding circuit 23.

Figure 14:
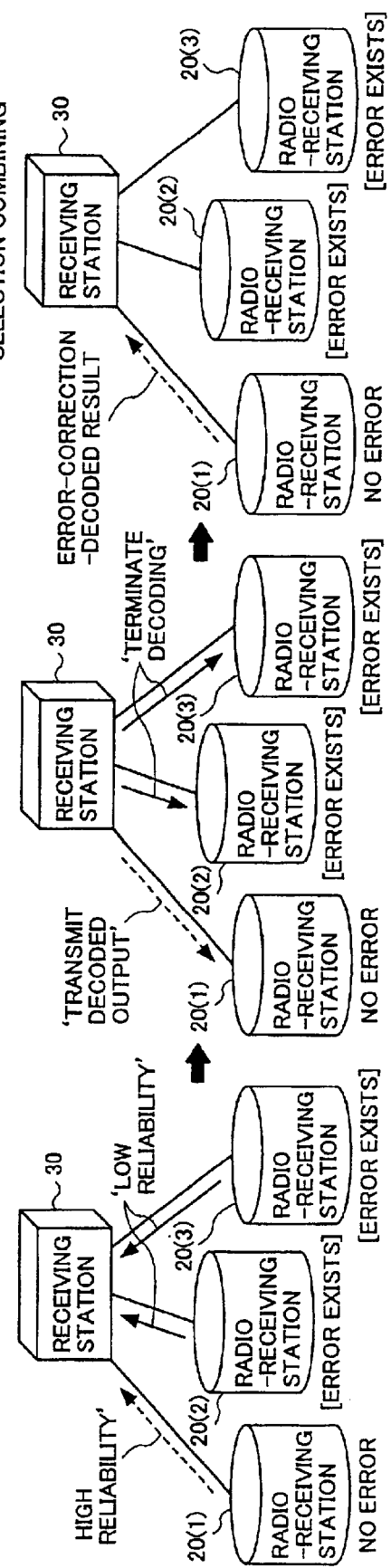

Then, when, in a process of rendering CRC-error detection on the error-correction-decoded output each time the number of times of the iterative processing by the turbo-decoding circuit 23 reaches the predetermined value, the error detection result from at least one base station (for exmaple, 20(1)) becomes of 'high reliability' as shown in FIG. 14A, the RNC 30 transmits the transmitting instructions for the error-correction-decoded output to the base station (20(1)) which has transmitted the error detection result of 'high reliability', and, also, transmits decoding termination instructions to the other base stations (20(2) and 20(3)) as shown in FIG. 14B. Then, the base station having received the transmitting instructions for the error-correction-decoded output transmits the error-correction-decoded output of the turbo-decoding circuit 23 to the RNC 30, as shown in FIG. 14C. Then, the RNC 30 having thus received the error-correction-decoded output renders selection combining on the thus-received error-correction-decoded output, and, thus, generates the reception-information sequence. Each base station having received the above-mentioned decoding termination instructions terminates the iterative processing by the turbo-decoding circuit 23 whatever the result of error detection on the error-correction-decoded output at that time is.

By such a process, it is possible to reduce the number of times of repetition of decoding processing to be rendered by each base station until the proper error-correction-decoded output is obtained, and, thereby, to reduce the time required for the processing at each base station until the proper error-correction-decoded output is obtained.

Figure 15:
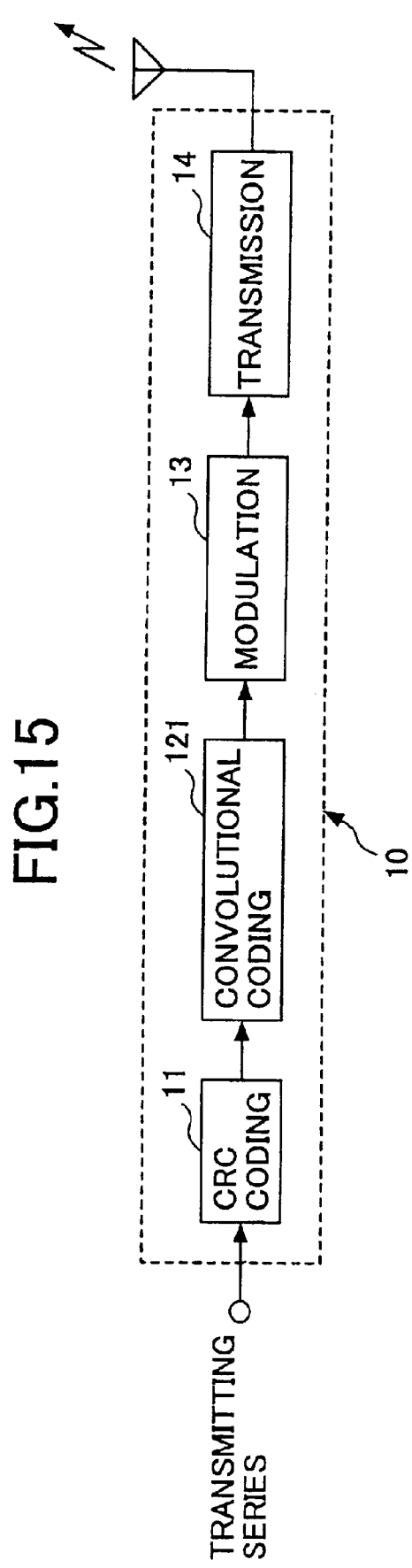
FIG. 15 is a block diagram showing another exmaple of a configuration of the transmitting part of the mobile set shown in FIG. 2.
Figure 16:
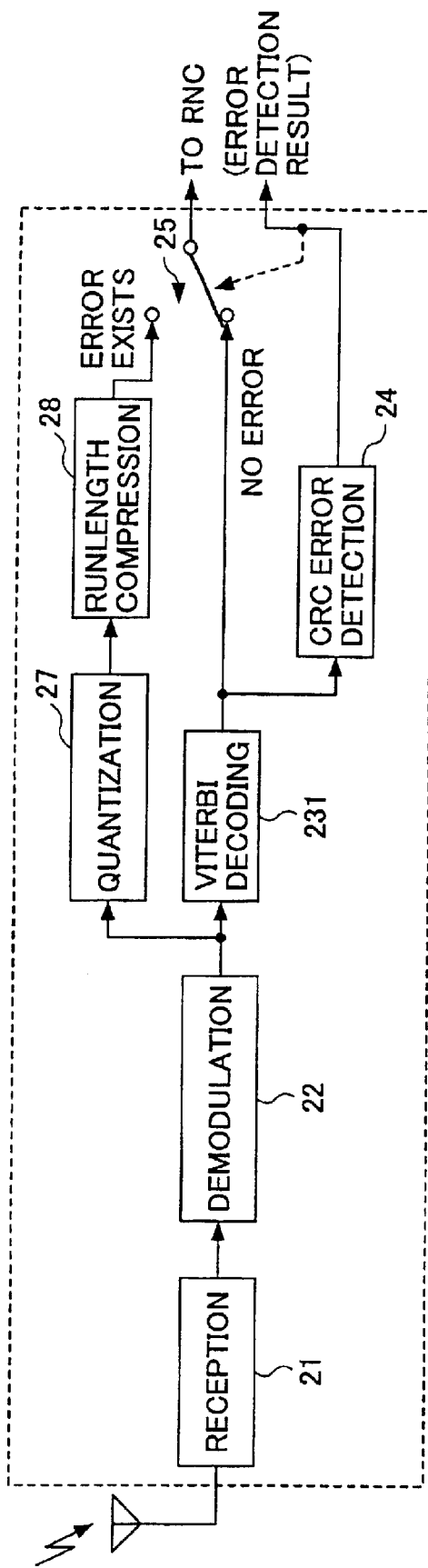
FIG. 16 is a block diagram showing another example of a configuration of the receiving part of each base station shown in FIG. 2.

In the above-mentioned radio-transmitting system, it is possible to configure the mobile set 10 and each base station 20(1), 20(2), 20(3) as those shown in FIGS. 15 and 16.

As shown in FIG. 15, the mobile set 10 has a transmitting part having a convolutional-coding circuit 121 instead of the turbo-coding circuit 12. Accordingly, after CRC coding is rendered on transmitting information sequence, convolutional coding is rendered on the information sequence as error-correction coding. Then, modulation is rendered on the signal series thus obtained through the convolutional-coding circuit 121, and the thus-obtained signal is transmitted.

As shown in FIG. 16, each base station 20(1), 20(2), 20(3) has a receiving part having a Viterbi decoding circuit 231 configured to correspond to the above-mentioned convolutional-coding circuit 121 of the mobile set 10, instead of the turbo-decoding circuit 23. Accordingly, Viterbi decoding is rendered after reception and demodulation of a signal from the mobile set 10, and CRC error detection is rendered on the thus-obtained Viterbi-decoded output. Then, when no error is detected as a result of the CRC error detection, the Viterbi decoded output is transmitted to the RNC 30 as the error-correction-decoded output.

Further, the receiving part of each base station 20(i) has a quantization circuit 27 which quantizes the demodulated output of the demodulator 22, and runlength compressing circuit 28 which compresses the quantized output, output from the quantizing circuit 27, in a runlength-compressing manner. Accordingly, when an error is detected as a result of the CRC error detection, the demodulated output (input signal to the Viterbi decoding circuit 231) is quantized, and coded in a runlength-coding manner. Then, the thus-obtained signal is transmitted to the RNC 30.

Figure 17:
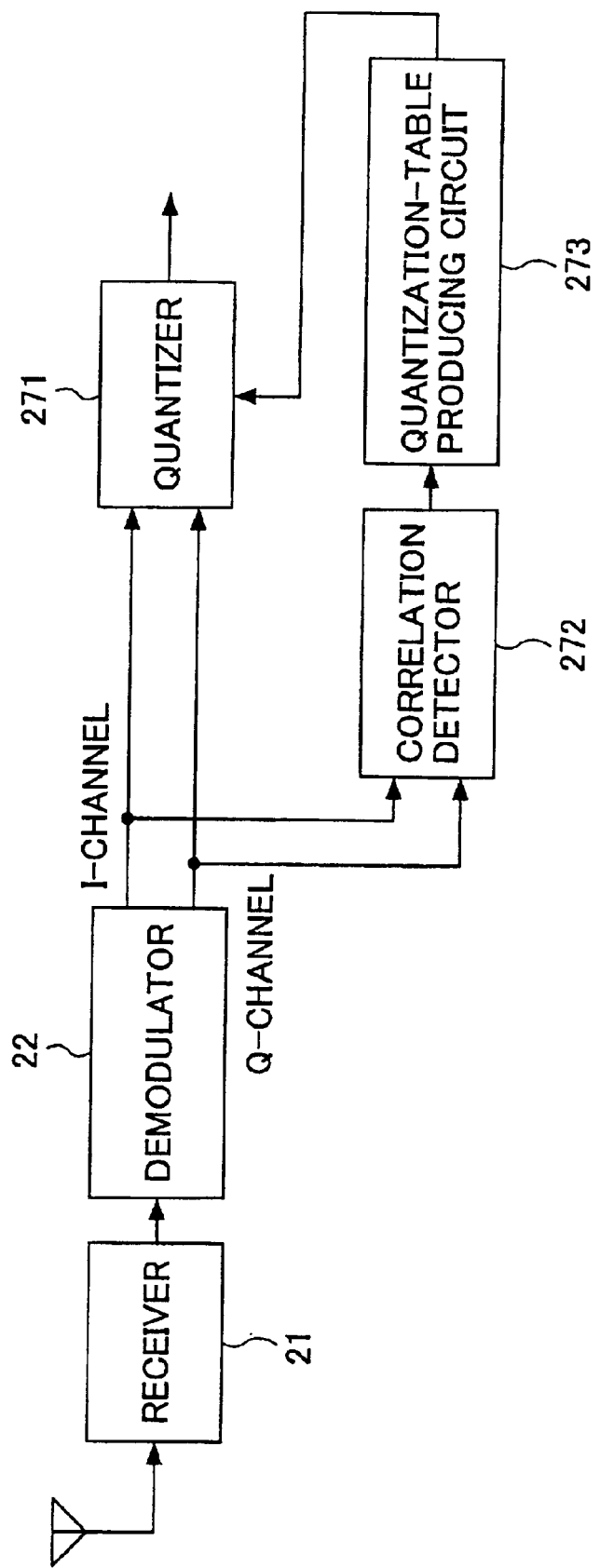
FIG. 17 is a block diagram showing an exmaple of a configuration of a quantization circuit shown in FIG. 16.

The above-mentioned quantization circuit 27 in each base station 20(i) can be configured as shown in FIG. 17, for example.

As shown in FIG. 17, the quantization circuit 27 includes a quantizer 271, a correlation detector 272, and a quantization-table producing circuit 273. The demodulator 22 which demodulates a received signal obtained through the receiver 21 has an I-channel and a Q-channel. The signals from the I-channel and Q-channel of the demodulator 22 obtained through the demodulation are input to the correlation detector 272. The correlation detector 272 measures a correlation between the signals of I-channel and Q-channel. Then, based on the measurement result of the correlation detector 272, the quantization-table producing circuit 273 produces a quantization table.

When the correlation between the respective signals of the I-channel and Q-channel output from the demodulator 22 is high, it is possible to reduce the number of quantization bits for either one of the channels. Accordingly, it is possible to produce the quantization table of high efficiency. By referring to the thus-produced quantization table, the quantizer 271 quantizes the demodulated output given from the demodulator 22.

Figure 18:
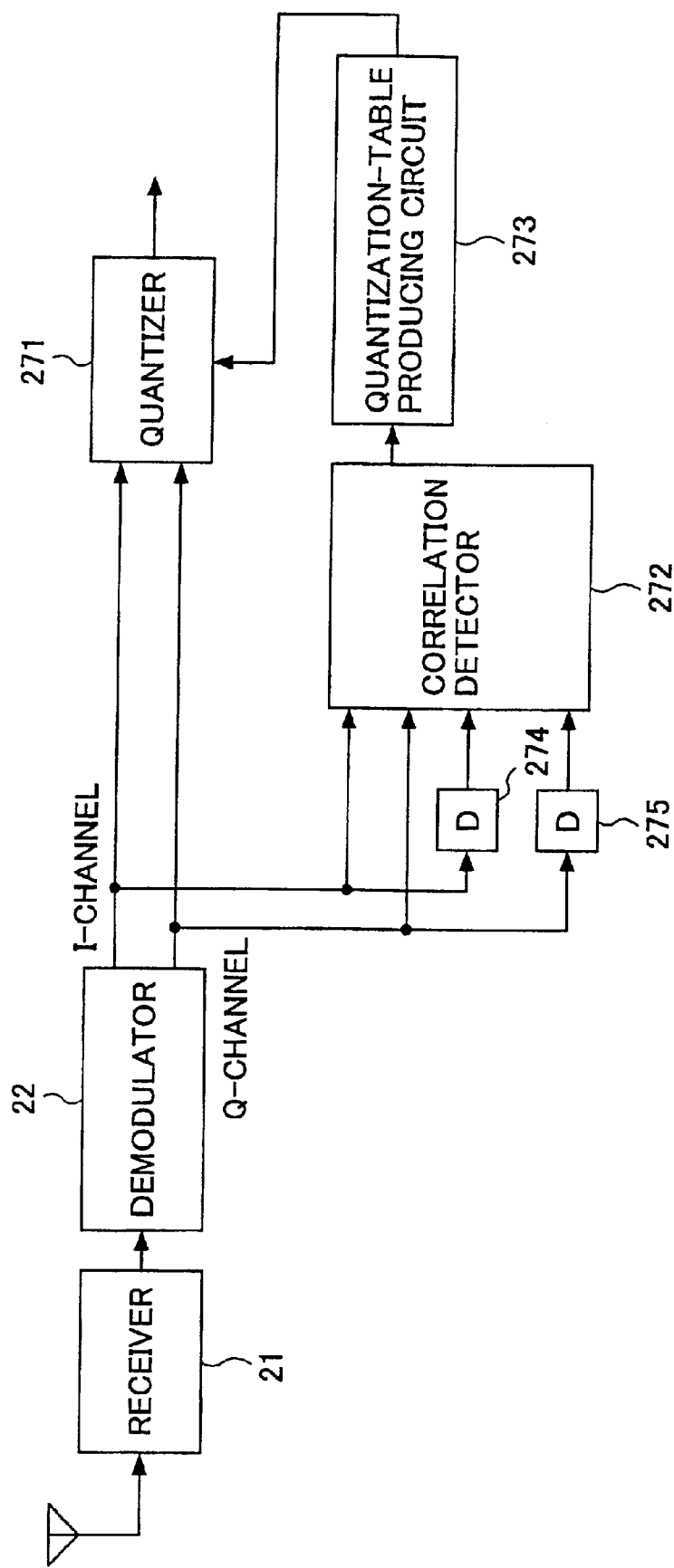
FIG. 18 is a block diagram showing another exmaple of a configuration of the quantization circuit shown in FIG. 16.

The above-mentioned quantization circuit 27 can also be configured as shown in FIG. 18.

In the example of FIG. 18, similar to the above-mentioned example, the quantization circuit 27 includes the quantizer 271, correlation detector 272 and quantization-table producing circuit 273. Further, in this quantization circuit 27, the signals of the I-channel and Q-channel from the demodulator 22 are directly input to the correlation detector 272, and, also, are input to the correlation detector 272 via delay devices 274 and 275, respectively.

In this quantization circuit 27, the correlation detector 272 measures a correlation between the respective signals based on the signals of I-channel and Q-channel, and the signals delayed therefrom by the delay devices 274 and 275, respectively. Then, it is possible to reduce the number of quantization bits for the signals (for exmaple, the signal of the Q-channel and both delayed signals) other than a certain signal (for example, the signal of the I-channel), and, thereby, it is possible to produce the quantization table of high efficiency. By referring to the thus-produced quantization table, the quantizer 271 quantizes the demodulated output from the demodulator 22.

Figure 19:
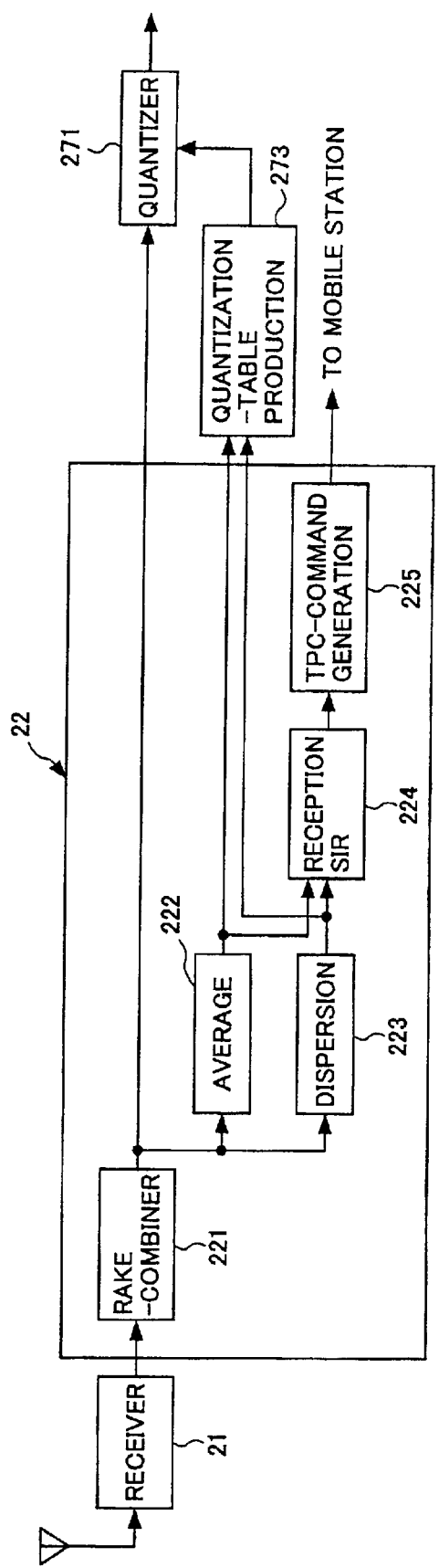
FIG. 19 is a block diagram showing an exmaple of a configuration of a demodulator and a quantization circuit shown in FIG. 16.

Further, the demodulator 22 and quantization circuit 27 can be configured as shown in FIG. 19, for example. This example is applied to a radio-transmitting system in a W-CDMA (Wide-Band Code Division Multiple Access) method.

As shown in FIG. 19, the demodulator 22 includes a RAKE combiner 221, an average calculating part 222, a dispersion calculating part 223, a reception SIR detecting part 224 and a TPC command generating part 225. Thus, in the W-CDMA method, a dispersed received signal is reverse-dispersed, the thus-obtained signal is then combined in a RAKE combining manner, and, then, in order to generate a power control (TPC) command of the mobile set, the average and dispersion of the output signal from the RAKE combiner 221 are calculated by the average calculating part 222 and dispersion calculating part 223, respectively, successively. Then, by using the thus-obtained average and dispersion, the quantization-table producing circuit 273 updates a quantization table successively. Then, by referring to the thus-updated quantization table, the demodulated output (RAKE-combined output) is quantized, and, thereby, it is possible to render efficient quantization of the demodulated output.

Figure 20:
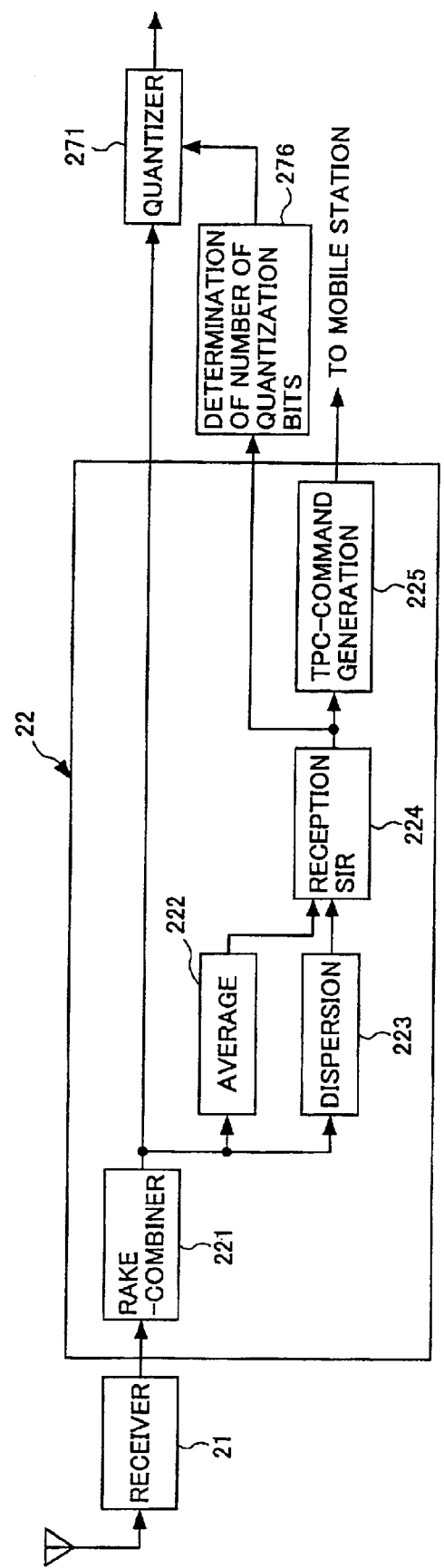
FIG. 20 is a block diagram showing another exmaple of a configuration of the demodulator and quantization circuit shown in FIG. 16.

Further, the quantization circuit 27 can also be configured as shown in FIG. 20.

This example is applied to a radio-transmitting system in the W-CDMA method similar to the above-mentioned exmaple.

As shown in FIG. 20, the demodulator 22 includes, similar to the example shown in FIG. 19, the RAKE combiner 221, average calculating part 222, dispersion calculating part 223, reception SIR detector 224 and TPC command generating part 225. Further, the quantization circuit 27 includes a quantizer 271 and a quantization-bit-number determining circuit 276. When the reception SIR detected by the reception SIR detector 224 is high, the communication quality is not easily degraded even when the number of quantization bits is reduced. Accordingly, the quantization-bit-number determining circuit 276 varies the number of quantization bits adaptively according to the reception SIR calculated for issuing the TPC command. For example, when the reception SIR is large, the number of quantization bits is decreased, but the number of quantization bits is increased when the reception SIR is small. Then, using the number of quantization bits determined by this quantization-bit-number determining circuit 271, the demodulated output (RAKE-combined output) is quantized by the quantizer 271. By such a quantization method, it is possible to render quantization of the demodulate output efficiently without degrading the communication quality.

Figure 21:
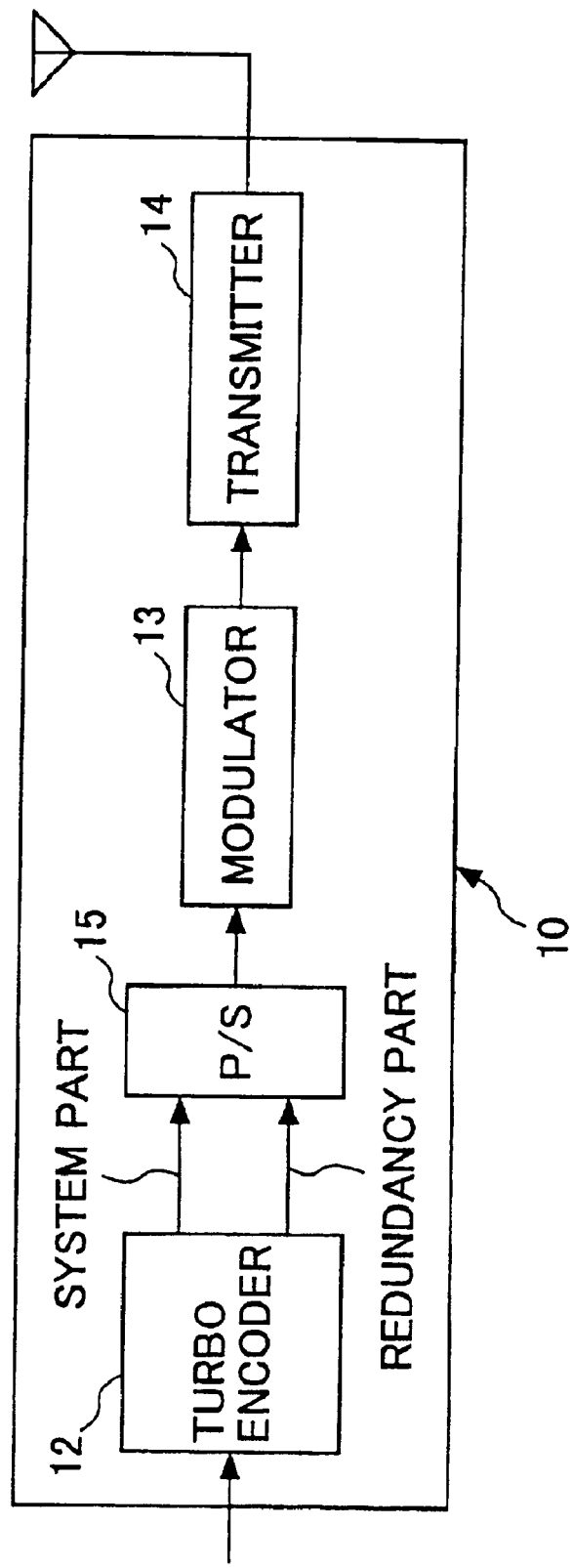
FIG. 21 is a block diagram showing another exmaple of a configuration of the transmitting part of the mobile set shown in FIG. 2.
Figure 22:
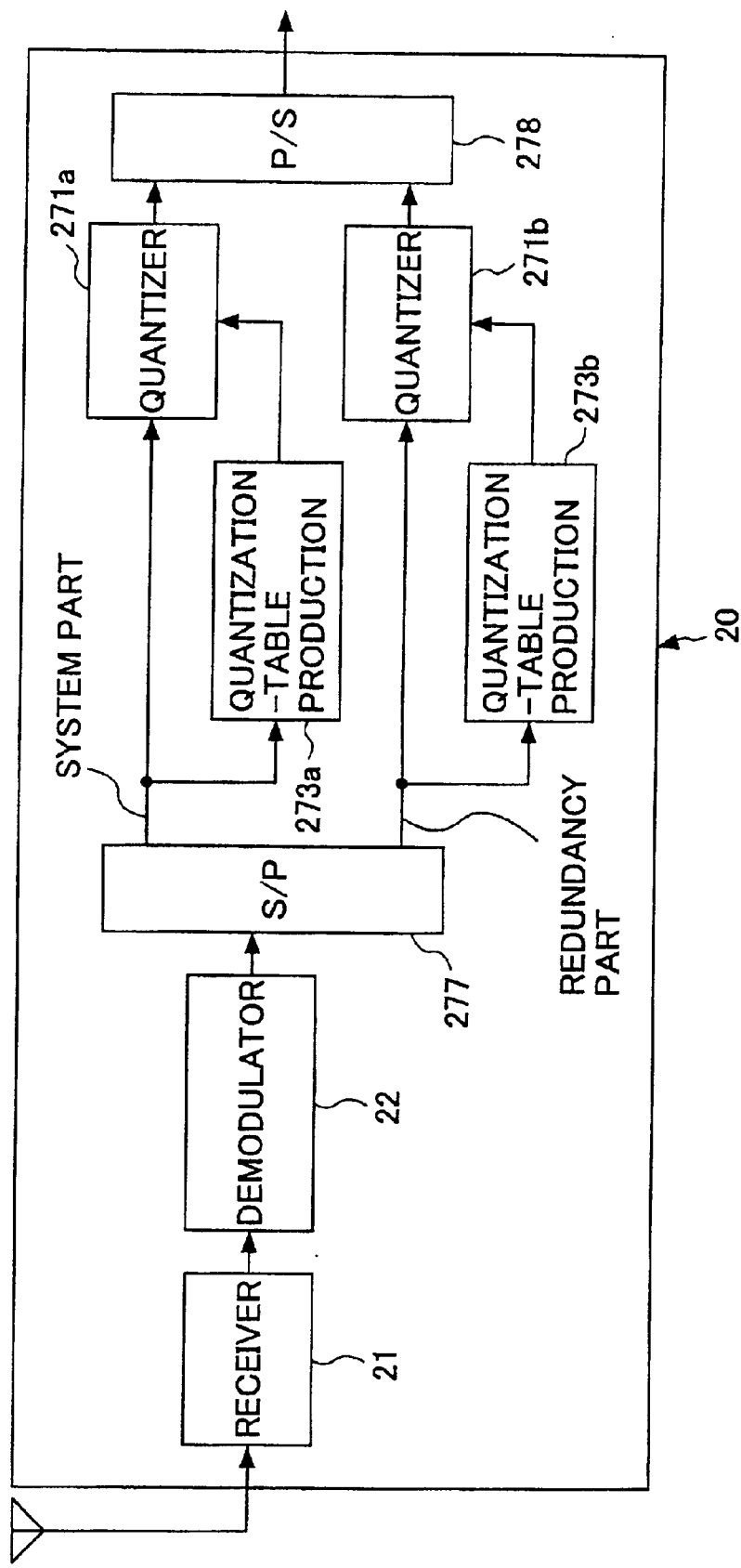
FIG. 22 is a block diagram showing another example of a configuration of the receiving part of each base station shown in FIG. 2.

The transmitting part of the mobile set 10 and receiving part of each base station 20($i$) can also be configured as shown in FIGS. 21 and 22.

As shown in FIG. 21, the transmitting part of the mobile set 10 includes the turbo-coding circuit 12, a parallel-to-series converter 15, the modulator 13 and transmitter 14. A system part and a redundancy part of a signal coded in the turbo-coding manner output from the turbo-coding circuit 12 are multiplexed by the parallel-to-serial converter 15. The signal thus obtained from the multiplexing is modulated by the modulator 13, and, the thus-obtained modulated signal is transmitted from the transmitter 14.

As shown in FIG. 22, the receiving part of each base station 20($i$) has the demodulator 22, and, also, a series-to-parallel converter 277 which divides the signal obtained from the multiplexing performed by the transmitting part of the above-mentioned mobile set 10 into the system part and redundancy part. This receiving part of the base station 20($i$) further includes a first quantization-table producing circuit 273$a$ producing a quantization table for the system part of the signal, and a first quantizer 271$a$ which quantizes the system part by referring to the quantization table produced by the first quantization-table producing circuit 273$a$; and a second quantization-table producing circuit 273$b$ producing a quantization table for the redundancy part of the signal, and a second quantizer 271$b$ which quantizes the redundancy part by referring to the quantization table produced by the second quantization-table producing circuit 273$b$. Then, the quantized outputs of the system part and redundancy part from the first and second quantizers 271$a$ and 271$b$ are multiplexed by a parallel-to-series converter 278, and, thus, the reception-information sequence is generated.

In the radio-transmitting system including the mobile set 10 and base stations 20(1), 20(2) and 20(3) configured as described above, the quantization tables are produced for the system part and redundancy part of the signal individually. In turbo decoding, the signal of system part is more important than the signal of redundancy part. Accordingly, by producing these quantization tables such that the quantization noise is smaller for the system part of the signal than for the redundancy part of the signal, it is possible to render efficient quantization.

The receiving part of each base station 20($i$) can also be configured as shown in FIG. 23.

As shown in FIG. 23, the receiving part of each base station 20($i$) includes the receiver 21, demodulator 22, quantizer 271 and quantization-bit-number determining circuit 276. The quantization-bit-number determining circuit 276 determines the number of quantization bits adaptively based on either one or both of required quality information, given from the RNC 30 which acts as a control station ranked higher than each base station 20($i$), and line-capacity information between the base station and RNC 30. Then, the quantizer 172 quantizes the demodulated output by using the thus-determined number of quantization bits.

By such a configuration of each base station 20($i$), communication having a quality required by a user, or communication having a higher quality according to a state of the amount of information transmitted between base station and RNC 30 can be rendered.

In each exmaple described above, radio-transmitting systems in each of which the mobile set 10 acts as a radio-transmitting station, the base stations 20(1), 20(2) and 20(3) act as a plurality of radio-receiving stations, and the control station RNC 30 acts as a receiving station have been described. However, the present invention is not necessary to be limited to such a configuration, and can be applied to a radio-transmitting system other than a mobile communication system. Further, each radio-receiving station (base station) and receiving station (RNC) may be connected either by a wired transmission path or a radio (wireless) transmission path.

The present invention is not limited to the above-described embodiment, and variations and modifications may be made without departing from the scope of the present invention.

The present application is based on Japanese priority application No. 2000-046625, filed on Feb. 23, 2000, the entire contents of which are hereby incorporated by reference.

What is claimed is:

1. A received-signal combining method of transmitting signals, based on a signal having undergone error-correction coding and transmitted from a radio-transmitting station, to a receiving station from a plurality of radio-receiving stations, and generating a reception-information sequence based on the thus-transmitted signals, by said receiving station, comprising the steps of:

a) each radio-receiving station rendering error-correction decoding and error detection processing on the signal transmitted from said radio-transmitting station, and transmitting the error-correction-decoding result to said receiving station when no error is detected by the error detection processing; and b) said receiving station combining the received error-correction-decoding results according to a first algorithm when receiving the error-correction-decoding results from any radio-receiving stations, and, thus, generating the reception-information sequence, wherein each radio-receiving station transmits the signal before undergoing the error-correction decoding processing when an error is detected in the error detection processing, and when receiving the signals before undergoing the error-correction decoding processing from all the radio-receiving stations, said receiving station combines the thus-received signals according to a second algorithm, then, renders error-correction decoding processing thereon, and, thus, generates the reception-information sequence.

2. The method as claimed in claim 1, wherein: each radio-receiving station receives a signal obtained through systematic coding processing as error-correction coding processing rendered by said radio-transmitting station, renders error detection processing when rendering every predetermined times of iterative processing of error-correction decoding processing, and transmits first information according to the result of the error detection processing or second information indicating a state of an error degree higher than that of the first information; when receiving the second information from all the radio-receiving stations, said receiving station sends instructions to all the radio-receiving stations to continue the decoding processing, but, when receiving the first information from any radio-receiving station, said receiving station sends instructions to said radio-receiving station to transmit the error-correction-decoding result; and when receiving the instructions to continue the decoding processing, each radio-receiving station continues the iterative processing of the error-correction decoding processing, but, when receiving the instructions to transmit the error-correction-decoding result, each radio-receiving station transmits the error-correction-decoding result to said receiving station.

3. The method as claimed in claim 2, wherein: when receiving the first information from any radio-receiving station, said receiving station sends to each other radio-receiving station instructions to terminate the error-correction decoding processing; when receiving the instructions to terminate the error-correction decoding processing, each radio-receiving station terminates the iterative processing of the error-correction decoding processing.

4. The method as claimed in claim 1, wherein: each radio-receiving station detects a reception SIR on reception of the signal from said radio-transmitting station, and transmits the thus-detected reception SIR to said receiving station when transmitting the error-correction-decoding result to said receiving station; and said receiving station combines the error-correction-decoding results determined based on the thus-received reception SIR, according to the first algorithm.

5. The method as claimed in claim 4, wherein said receiving station combines the error-correction-decoding results transmitted from the radio-receiving stations for which the reception SIR is maximum, and, thus, generates the reception-information sequence.

6. The method as claimed in claim 1, wherein the combining according to the first algorithm comprises selection combining.

7. The method as claimed in claim 1, wherein the combining according to the second algorithm comprises maximum ratio combining.

8. The method as claimed in claim 1, wherein, when transmitting a signal obtained through quantization of an output of a demodulator to said receiving station, but before the signal undergoes the error-correction decoding processing, each radio-receiving station produces a quantization table corresponding to two-dimensional information comprising an I-channel output signal and a Q-channel output signal from said demodulator, and renders the quantization of the output of said demodulator referring to said quantization table.

9. The method as claimed in claim 1, wherein, when transmitting a signal obtained through quantization of an output of a demodulator to said receiving station as the signal before undergoing the error-correction decoding processing, each radio-receiving station produces a quantization table corresponding to information comprising successive I-channel output signals and Q-channel output signals given from said demodulator, and renders the quantization of the output of said demodulator referring to said quantization table.

10. The method as claimed in claim 1, wherein, when transmitting a signal obtained through quantization of an output of a demodulator to said receiving station, but before the signal undergoes the error-correction decoding processing, each radio-receiving station produces a quantization table successively by using average and dispersion calculated from the output signal given from said demodulator, and renders the quantization of the output of said demodulator referring to said quantization table.

11. The method as claimed in claim 1, wherein, when transmitting a signal obtained through quantization of a signal before undergoing the error-correction decoding processing to said receiving station, each radio-receiving station determines the number of quantization bits based on a reception SIR predicted from the signal before undergoing the error-correction decoding processing, and renders quantization of the signal before undergoing the error-correction decoding processing by using the thus-determined number of quantization bits.

12. The method as claimed in claim 1, wherein, when receiving a signal obtained through systematic coding processing rendered as error-correction coding processing by said radio-transmitting station, and transmitting a signal obtained through quantization of a signal before undergoing the error-correction decoding processing comprising iterative processing, each radio-receiving station produces quantization tables different for respective ones of a system part and a redundancy part of the signal before undergoing the error-correction decoding processing, and renders quantization of the system part and redundancy part of the signal before undergoing the error-correction decoding processing referring to the respective ones of the thus-produced quantization tables.

13. The method as claimed in claim 1, wherein, when transmitting a signal obtained through quantization of a signal before undergoing the error-correction decoding processing to said receiving station, each radio-receiving station determines the number of quantization bits according to a state of an amount of information transmitted between said receiving station and said radio-receiving station, and renders quantization of the signal before undergoing the error-correction decoding processing by using the thus-determined number of quantization bits.

14. The method as claimed in claim 1, wherein, when transmitting a signal obtained through quantization of a signal before undergoing the error-correction decoding processing to said receiving station, each radio-receiving station determines the number of quantization bits according to a communication quality requested by said receiving station, and renders quantization of the signal before undergoing the error-correction decoding processing by using the thus-determined number of quantization bits.

15. A received-signal combining method of transmitting signals, based on a signal having undergone error-correction coding and transmitted from a radio-transmitting station, to a receiving station from a plurality of radio-receiving stations, and generating a reception-information sequence based on the thus-transmitted signals, by said receiving station, comprising the steps of:

a) each radio-receiving station rendering error-correction decoding and error detection processing on the signal transmitted from said radio-transmitting station, and transmitting first information according to the error detection result or second information indicating a state in that an error degree is higher than that of the first information to said receiving station;

b) when receiving the first information from any radio-receiving station, said receiving station transmitting first signal transmitting instructions to said radio-receiving station, and, when receiving the second information from all the radio-receiving stations, said receiving station transmitting second signal transmitting instructions to all the radio-receiving stations;

c) when receiving the first signal transmitting instructions from said receiving station, each radio-receiving station transmitting the error-correction-decoding result to said receiving station, but when receiving the second signal transmitting instructions from said receiving station, each radio-receiving station transmitting the signal before undergoing the error-correction decoding processing;

d) when receiving the error-correction-decoding results from any radio-receiving stations, said receiving station combining the thus-received results according to a first algorithm so as to generate the reception-information sequence, but, when receiving the signals before undergoing the error-correction decoding from all the radio-receiving stations, said receiving station combining the thus-received signals according to a second algorithm and then rendering error-correction decoding processing thereon so as to generate the reception-information sequence.

16. The method a claimed in claim 15, wherein: each radio-receiving station detects a reception SIR on reception of the signal from said radio-transmitting station, and transmits the thus-detected reception SIR to said receiving station when transmitting the error-correction-decoding result to said receiving station; and said receiving station combines the error-correction-decoding results determined based on the thus-received reception SIR, according to the first algorithm.

17. The method as claimed in claim 16, wherein said receiving station combines the error-correction-decoding results transmitted from the radio-receiving stations for which the reception SIR is maximum, and, thus, generates the reception-information sequence.

18. The method as claimed in claim 15, wherein the combining according to the first algorithm comprises selection combining.

19. The method as claimed in claim 15, wherein the combining according to the second algorithm comprises maximum ratio combining.

20. The method as claimed in claim 15, wherein, when transmitting a signal obtained through quantization of an output of a demodulator to said receiving station, but before the signal undergoes the error-correction decoding processing, each radio-receiving station produces a quantization table corresponding to two-dimensional information comprising an I-channel output signal and a Q-channel output signal from said demodulator, and renders the quantization of the output of said demodulator referring to said quantization table.

21. The method as claimed in claim 15, wherein, when transmitting a signal obtained through quantization of an output of a demodulator to said receiving station, but before the signal undergoes the error-correction decoding processing, each radio-receiving station produces a quantization table corresponding to information comprising successive I-channel output signals and Q-channel output signals given from said demodulator, and renders the quantization of the output of said demodulator referring to said quantization table.

22. The method as claimed in claim 15, wherein, when transmitting a signal obtained through quantization of an output of a demodulator to said receiving station, but before the signal undergoes the error-correction decoding processing, each radio-receiving station produces a quantization table successively by using average and dispersion calculated from the output signal given from said demodulator, and renders the quantization of the output of said demodulator referring to said quantization table.

23. The method as claimed in claim 15, wherein, when transmitting a signal obtained through quantization of a signal before undergoing the error-correction decoding processing to said receiving station, each radio-receiving station determines the number of quantization bits based on a reception SIR predicted from the signal before undergoing the error-correction decoding processing, and renders quantization of the signal before undergoing the error-correction decoding processing by using the thus-determined number of quantization bits.

24. The method as claimed in claim 15, wherein, when receiving a signal obtained through systematic coding processing rendered as error-correction coding processing by said radio-transmitting station, and transmitting a signal obtained through quantization of a signal before undergoing the error-correction decoding processing comprising iterative processing, each radio-receiving station produces quantization tables different for respective ones of a system part and a redundancy part of the signal before undergoing the error-correction decoding processing, and renders quantization of the system part and redundancy part of the signal before undergoing the error-correction decoding processing referring to the respective ones of the thus-produced quantization tables.

25. The method as claimed in claim 15, wherein, when transmitting a signal obtained through quantization of a signal before undergoing the error-correction decoding processing to said receiving station, each radio-receiving station determines the number of quantization bits according to a state of an amount of information transmitted between said receiving station and said radio-receiving station, and renders quantization of the signal before undergoing the error-correction decoding processing by using the thus-determined number of quantization bits.

26. The method as claimed in claim 15, wherein, when transmitting a signal obtained through quantization of a signal before undergoing the error-correction decoding processing to said receiving station, each radio-receiving station determines the number of quantization bits according to a communication quality requested by said receiving station, and renders quantization of the signal before undergoing the error-correction decoding processing by using the thus-determined number of quantization bits.

27. A received-signal combining system for transmitting a signal, based on a signal having undergone error-correction coding and transmitted from a radio-transmitting station, to a receiving station from a plurality of radio-receiving stations, and generating a reception-information sequence based on the thus-transmitted signal by said receiving station, wherein:

each radio-receiving station comprises a first error-correction decoding part rendering error-correction decoding on the signal transmitted from said radio-transmitting station, an error detecting part rendering error detection processing on the thus-received signal, and a first transmission control part transmitting the error-correction-decoding result obtained by said first error-correction decoding part to said receiving station when no error is detected by said error detecting part; and said receiving station comprises a first combining part, and, when receiving the error-correction-decoding results from any radio-receiving stations, said first combining part combining the thus-received error-correction-decoding results according to a first algorithm, and, thus, generating the reception-information sequence, wherein: each radio-receiving station further comprises a second transmission control part which transmits the signal before undergoing the error-correction decoding processing when an error is detected by said error detecting part, and said receiving station comprises a second combining part and a second error-correction decoding part, wherein, when said receiving station receives the signals before undergoing the error-correction decoding processing from all the radio-receiving stations, said second combining part combines the thus-received signals according to a second algorithm, said second error-correction decoding part renders error-correction decoding processing on the signal obtained by said second combining part, and, thus, generates the reception-information sequence.

28. The system as claimed in claim 27, wherein: said first error-correction coding part comprises a systematic-coding decoding part which receives a signal obtained through systematic coding processing rendered as error-correction coding processing by said radio-transmitting station, and renders error-correction decoding comprising iterative processing; each radio-receiving station further comprises an error-state-information transmitting part which transmits first information according to the error detection result obtained by said error detecting part every predetermined times of the iterative processing of error-correction decoding processing rendered by said systematic-coding decoding part, or second information indicating a state of an error degree higher than that of the first information; said receiving station further comprises a first instructing part and a second instructing part, wherein, when said receiving station receives the second information from all the radio-receiving stations, said first instructing part sends instructions to all the radio-receiving stations to continue the decoding processing, but, when said receiving station receives the first information from any radio-receiving station, said second instructing part sends instructions to said radio-receiving station to transmit the error-correction-decoding result; and when receiving the instructions to continue the decoding processing, each radio-receiving station continues the error-correction decoding processing comprising the iterative processing by said systematic-coding decoding part, but, when receiving the instructions to transmit the error-correction-decoding result, each radio-receiving station transmits the error-correction-decoding result obtained by said systematic-coding decoding part to said receiving station.

29. The system as claimed in claim 28, wherein: said receiving station further comprises a third instructing part, wherein, when said receiving station receives the first information from any radio-receiving station, said third instructing part sends to the other each radio-receiving station instructions to terminate the error-correction decoding processing; and when receiving the instructions to terminate the error-correction decoding processing from said receiving station, each radio-receiving station terminates the iterative processing of the error-correction decoding processing.

30. The received-signal combining system as claimed in claim 27, wherein said each radio-receiving station further comprises a quantization part which includes a quantization table and quantizes so as to reduce the number of bits of the signal transmitted from said radio-transmitting station using said quantization table before the signal is transmitted to said receiving station when an error is detected by said error detecting part.

31. A received-signal combining system for transmitting signals, based on a signal having undergone error-correction coding and transmitted from a radio-transmitting station, to a receiving station from a plurality of radio-receiving stations, and generating a reception-information sequence based on the thus-transmitted signals, by said receiving station, wherein:

each radio-receiving station comprises a first error-correction decoding part rendering error-correction decoding on the signal transmitted from said radio-transmitting station, an error detecting part rendering error detection processing on the thus-received signal and an error-state-information transmitting part transmitting first information according to the error detection result of said error detecting part or second information indicating a state in that an error degree is higher than that of the first information to said receiving station;

said receiving station comprises a first signal transmitting instructing part and a second signal transmitting instructing part, wherein, when said receiving station receives the first information from any radio-receiving station, said first signal transmitting instructing part transmits first signal transmitting instructions to said radio-receiving station, and, when said receiving station receives the second information from all the radio-receiving stations, said second signal transmitting instructing part transmits second signal transmitting instructions to all the radio-receiving stations; each radio-receiving station further comprises a first transmission control part and a second transmission control part, wherein, when said radio-receiving station receives the first signal transmitting instructions from said receiving station, said first transmission control part transmits the error-correction-decoding result to said receiving station, but when said radio-receiving station receives the second signal transmitting instructions from said receiving station, said second transmission part transmits the signal before undergoing the error-correction decoding processing to said receiving station; and said receiving station further comprises a first combining part, a second combining part and a second error-correction decoding part, wherein, when said receiving station receives the error-correction-decoding results from any radio-receiving stations, said first combining part combines the thus-received results according to a first algorithm so as to generate the reception-information sequence, but, when said receiving station receives the signals before undergoing the error-correction decoding from all the radio-receiving stations, said second combining part combines the thus-received signals according to a second algorithm and said second error-correction decoding part renders error-correction decoding processing on the signal obtained by said second combining part so as to generate the reception-information sequence.

32. The received-signal combining system as claimed in claim 31, wherein said each radio-receiving station further comprises a quantization part which includes a quantization table and quantizes so as to reduce the number of bits of the signal transmitted from said radio-transmitting station using said quantization table before the signal is transmitted to said receiving station when an error is detected by said error detecting part.

33. A radio-receiving station used in a received-signal combining method of transmitting signals, based on a signal having undergone error-correction coding and transmitted from a radio-transmitting station, to a receiving station from the plurality of radio-receiving stations, and generating a reception-information sequence based on the thus-transmitted signals, by said receiving station, comprises:

an error-correction decoding part rendering error-correction decoding on the signal transmitted from said radio-transmitting station; an error detecting part rendering error detection processing on the thus-received signal;

a first transmission control part transmitting the error-correction-decoding result obtained by said first error-correction decoding part to said receiving station when no error is detected by said error detecting part, so that said receiving station can combine the received error-correction-decoding results according to a first algorithm when receiving the error-correction-decoding results from the radio-receiving stations, and, thus, generate the reception-information sequence; and a second transmission control part which transmits the signal before undergoing the error-correction decoding processing when an error is detected by said error detecting part, so that, when receiving the signals before undergoing the error-correction decoding processing from all the radio-receiving stations, said receiving station can combine the thus-received signals according to a second algorithm, then render error-correction decoding processing thereon, and, thus, generate the reception-information sequence.

34. The radio-receiving station as claimed in claim 33, wherein: said error-correction coding part comprises a systematic-coding decoding part which receives a signal obtained through systematic coding processing rendered as error-correction coding processing by said radio-transmitting station, and renders error-correction decoding comprising iterative processing; said radio-receiving station further comprises an error-state-information transmitting part transmits first information according to the error detection result obtained by said error detecting part every predetermined times of the iterative processing of error-correction decoding processing rendered by said systematic-coding decoding part, or second information indicating a state of an error degree higher than that of the first information, to said receiving station, so that, when receiving the second information from all the radio-receiving stations, said receiving station can send instructions to all the radio-receiving stations to continue the decoding processing, but, when receiving the first information from any radio-receiving station, said receiving station can send instructions to said radio-receiving station to transmit the error-correction-decoding result, wherein, when receiving the instructions to continue the decoding processing, said radio-receiving station continues the error-correction decoding processing comprising the iterative processing by said systematic-coding decoding part, but, when receiving the instructions to transmit the error-correction-decoding result, said radio-receiving station transmits the error-correction-decoding result obtained by said systematic-coding decoding part to said receiving station.

35. The radio-receiving station as claimed in claim 34, wherein, when receiving instructions to terminate the error-correction decoding processing from said receiving station, said radio-receiving station terminates the error-correction decoding processing for which the iterative processing is rendered by said systematic-coding decoding part.

36. The radio-receiving station claimed in claim 33, further comprises a quantization part which includes a quantization table and quantizes so as to reduce the number of bits of the signal transmitted from said radio-transmitting station using said quantization table before the signal is transmitted to said receiving station when an error is detected by said error detecting part.

37. A radio-receiving station used in a received-signal combining method of transmitting signals, based on a signal having undergone error-correction coding and transmitted from a radio-transmitting station, to a receiving station from the plurality of radio-receiving stations, and generating a reception-information sequence based on the thus-transmitted signals, by said receiving station, comprising:

an error-correction decoding part rendering error-correction decoding on the signal transmitted from said radio-transmitting station; an error detecting part rendering error detection processing on the thus-received signal; an error-state-information transmitting part transmitting first information according to the error detection result of said error detecting part or second information indicating a state in that an error degree is higher than that of the first information, to said receiving station, so that, when receiving the first information from any radio-receiving station, said receiving station can transmit first signal transmitting instructions to said radio-receiving station, and, when receiving the second information from all the radio-receiving stations, said receiving station can transmit second signal transmitting instructions to all the radio-receiving stations; and a first transmission control part and a second transmission control part, wherein, when said radio-receiving station receives the first signal transmitting instructions from said receiving station, said first transmission control part transmits the error-correction-decoding result to said receiving station, but when said radio-receiving station receives the second signal transmitting instructions from said receiving station, said second transmission part transmits the signal before undergoing the error-correction decoding processing, so that, when receiving the error-correction-decoding results from any radio-receiving stations, said receiving station can combine the thus-received results according to a first algorithm so as to generate the reception-information sequence, but, when receiving the signals before undergoing the error-correction decoding from all the radio-receiving stations, said receiving station can combine the thus-received signals according to a second algorithm and render error-correction decoding processing thereon so as to generate the reception-information sequence.

38. The radio-receiving station claimed in claim 37, further comprises a quantization part which includes a quantization table and quantizes so as to reduce the number of bits of the signal transmitted from said radio-transmitting station using said quantization table before the signal is transmitted to said receiving station when an error is detected by said error detecting part.

39. A receiving station used in a received-signal combining method of transmitting signals, based on a signal having undergone error-correction coding and transmitted from a radio-transmitting station, to said receiving station from a plurality of radio-receiving stations, and generating a reception-information sequence based on the thus-transmitted signals, by said receiving station, comprising:

a first combining part combining received error-correction-decoding results according to a first algorithm when receiving the error-correction-decoding results from any radio-receiving stations, and, thus, generating the reception-information sequence; and a second combining part and an error-correction decoding part, wherein, when said receiving station receives the signals before undergoing the error-correction decoding processing from all the radio-receiving stations, said second combining part combines the thus-received signals according to a second algorithm, said error-correction decoding part renders error-correction decoding processing on the signal obtained by said second combining part, and, thus, generates the reception-information sequence.

40. A receiving station used in a received-signal combining method of transmitting signals, based on a signal having undergone error-correction coding and transmitted from a radio-transmitting station, to a receiving station from a plurality of radio-receiving stations, and generating a reception-information sequence based on the thus-transmitted signals, by said receiving station, comprising:

a first signal transmitting instructing part and a second signal transmitting instructing part, wherein, when said receiving station receives first information according to a result of error detection from any radio-receiving station, said first signal transmitting instructing part transmits first signal transmitting instructions to said radio-receiving station, and, when said receiving station receives second information, which indicates a state of a degree of error higher than that of the first information, from all the radio-receiving stations, said second signal transmitting instructing part transmits second signal transmitting instructions to all the radio-receiving stations; and a first combining part, a second combining part and an error-correction decoding part, wherein, when said receiving station receives error-correction-decoding results in response to the first signal transmitting instructions from any radio-receiving stations, said first combining part combines the thus received results according to a first algorithm so as to generate the reception-information sequence, but, when said receiving station receives signals before undergoing the error-correction decoding in response to the second signal transmitting instructions from all the radio-receiving stations, said second combining part combines the thus-received signals according to a second algorithm and said error-correction decoding part renders error-correction decoding processing on the signal obtained by said second combining part so as to generate the reception-information sequence.

41. The receiving station as claimed in claim 40, wherein: said receiving station transmits/receives signals to/from each radio-receiving station which transmits first information according to the error detection result obtained through error detecting processing rendered every predetermined times of iterative processing of error-correction decoding processing corresponding to systematic coding, or second information indicating a state of an error degree higher than that of the first information, said receiving station further comprises a first instructing part and a second instructing part, wherein, when said receiving station receives the second information from all the radio-receiving stations, said first instructing part sends instructions to all the radio-receiving stations to continue the decoding processing, but, when said receiving station receives the first information from any radio-receiving station, said second instructing part sends instructions to said radio-receiving station to transmit the error-correction-decoding result.

42. The receiving station as claimed in claim 41, wherein: said receiving station further comprises a third instructing part, wherein, when said receiving station receives the first information from any radio-receiving station, said third instructing part sends to the other each radio-receiving station instructions to terminate the error-correction decoding processing.

* * * * *